(12) United States Patent
Kim et al.

(10) Patent No.: US 12,476,754 B2
(45) Date of Patent: Nov. 18, 2025

(54) MULTI-SIM DEVICE AND OPERATION METHOD THEREOF

(71) Applicant: Samsung Electronics Co., Ltd., Suwon-si (KR)

(72) Inventors: Youngtaek Kim, Suwon-si (KR); Kyungjae Jun, Suwon-si (KR); Youngju Yoon, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 423 days.

(21) Appl. No.: 17/736,207

(22) Filed: May 4, 2022

(65) Prior Publication Data

US 2022/0360395 A1    Nov. 10, 2022

(30) Foreign Application Priority Data

May 4, 2021 (KR) .................. 10-2021-0058128

(51) Int. Cl.
*H04L 5/00* (2006.01)
*H04W 74/0833* (2024.01)
*H04W 88/06* (2009.01)

(52) U.S. Cl.
CPC ....... *H04L 5/0048* (2013.01); *H04W 74/0833* (2013.01); *H04W 88/06* (2013.01)

(58) Field of Classification Search
None
See application file for complete search history.

(56) References Cited

U.S. PATENT DOCUMENTS

| | | |
|---|---|---|
| 8,768,392 B2 | 7/2014 | Ohta et al. |
| 8,934,460 B1 | 1/2015 | Hu et al. |
| 8,976,780 B2 | 3/2015 | Cai et al. |
| 9,167,373 B2 | 10/2015 | Derkach et al. |
| 9,265,018 B2 | 2/2016 | Yi et al. |
| 9,674,758 B2 | 6/2017 | Tsai et al. |

(Continued)

FOREIGN PATENT DOCUMENTS

| | | |
|---|---|---|
| KR | 101549374 B1 | 5/2015 |
| KR | 101899478 B1 | 9/2018 |
| KR | 102066425 B1 | 1/2020 |

OTHER PUBLICATIONS

"LTE; Evolved Universal Terrestrial Radio Access (E-UTRA) Medium Access Control (MAC) protocol specification (3GPP TS 36.321 version 16.2.0 Release 16)" ETSI TS 136 321; 3GPP5G (2020).

(Continued)

*Primary Examiner* — Kouroush Mohebbi
(74) *Attorney, Agent, or Firm* — Harness, Dickey & Pierce, P.L.C.

(57) ABSTRACT

A multi-subscriber identity module (SIM) device including a first SIM for first wireless communication, a second SIM for second wireless communication, and a processor configured to allocate a radio frequency (RF) resource to any one of the first and second SIMs, control first uplink time alignment of the first wireless communication by allocating the RF resource to the first SIM, and adjust a first time alignment timer for the first uplink time alignment based on an RF resource allocation gap of the first SIM when the RF resource is allocated from the first SIM to the second SIM and the RF resource is reallocated from the second SIM to the first SIM may be provided.

18 Claims, 18 Drawing Sheets

(56) References Cited

U.S. PATENT DOCUMENTS

| | | |
|---|---|---|
| 9,681,405 B2 | 6/2017 | Jang et al. |
| 10,412,591 B2 | 9/2019 | Su et al. |
| 2015/0350934 A1 | 12/2015 | Yang et al. |
| 2018/0242368 A1* | 8/2018 | Dinan .................... H04W 48/00 |
| 2019/0053130 A1* | 2/2019 | Guo ...................... H04L 1/0026 |

OTHER PUBLICATIONS

"5G; NR; Medium Access Control (MAC) protocol specification (3GPP TS 38.321 version 16.2.1 Release 16)" ETSI TS 138 321 (2020).

* cited by examiner

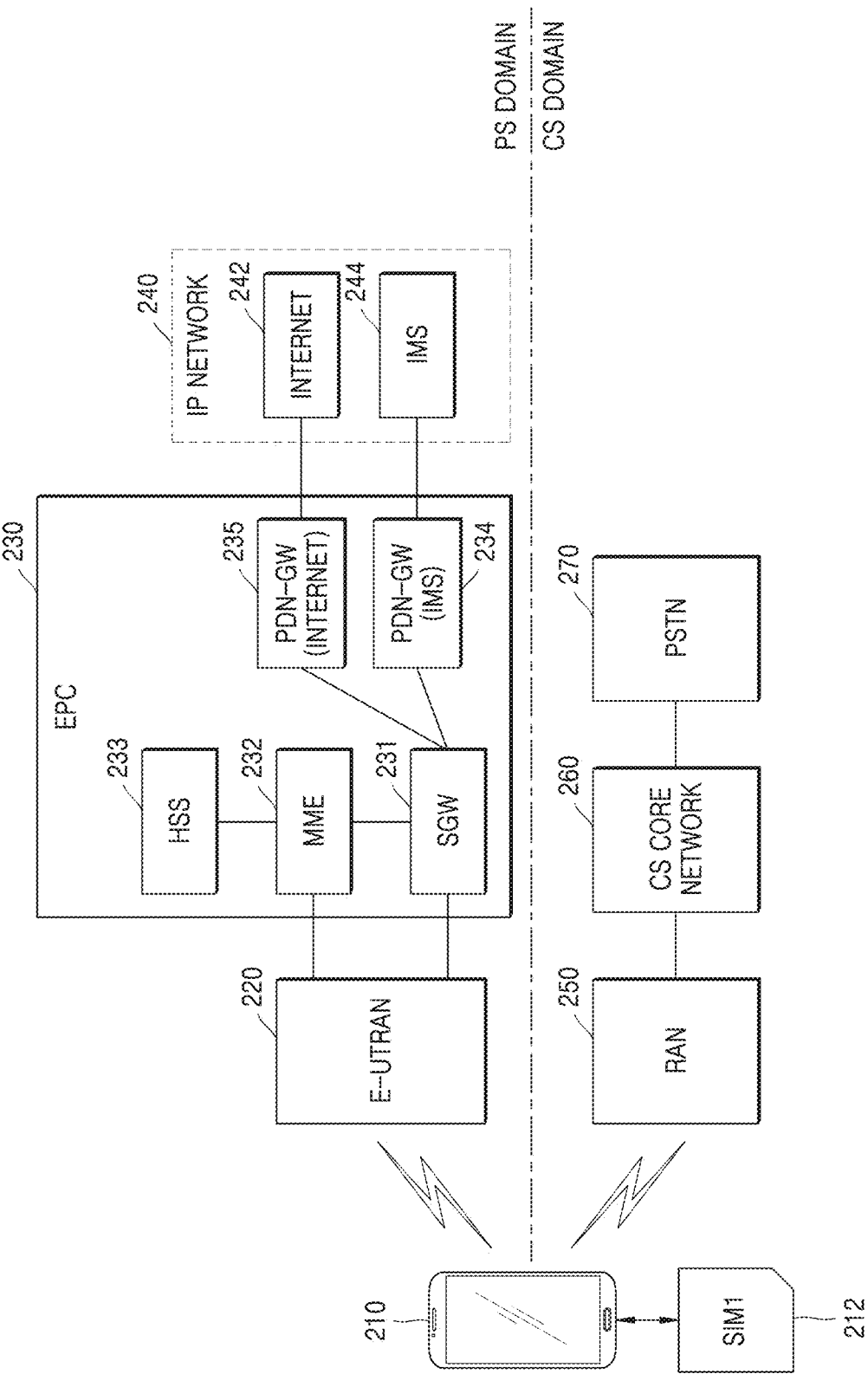

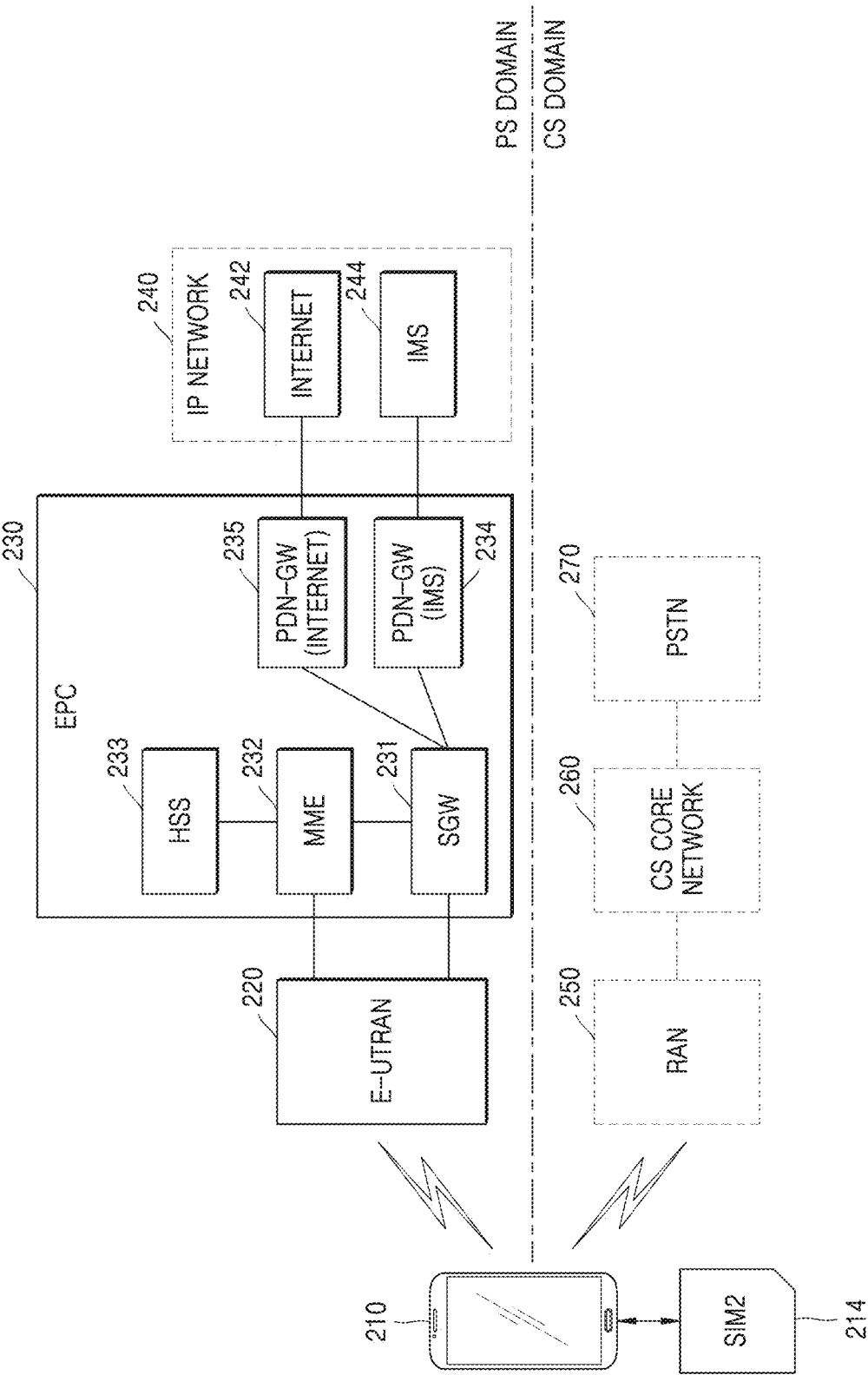

| PROCESS TYPE | EXTENDED TIME |
|---|---|
| Type #1 | T_EXT #1 |
| Type #2 | T_EXT #2 |
| Type #3 | T_EXT #3 |

Ref_TB

MULTI-SIM DEVICE AND OPERATION METHOD THEREOF

CROSS-REFERENCE TO RELATED APPLICATION

This application is based on and claims priority under 35 U.S.C. § 119 to Korean Patent Application No. 10-2021-0058128, filed on May 4, 2021, in the Korean Intellectual Property Office, the disclosure of which is incorporated by reference herein in its entirety.

BACKGROUND

The inventive concepts relate to wireless communications through a plurality of wireless networks, and more particularly, to a multi-subscriber identity module (SIM) devices and operation methods thereof.

A multi-SIM device such as a mobile phone, a personal digital assistant, a tablet personal computer (PC), or a laptop PC may include two or more SIMs. Each SIM may include a unique international mobile subscriber identity (IMSI) and key information with which a user of a wireless communication device is identified and authenticated by a service provider. The multi-SIM device may allow the user to access various networks by using multiple SIMs. The networks may include a circuit switched (CS) network (e.g., a second generation (2G) network or a third generation (3G) network) and a packet switched (PS) network (e.g., a fourth generation (4G) network). The 4G network may include an Internet packet data network and an Internet protocol (IP) multimedia subsystem (IMS) packet data network.

When the multi-SIM device is a dual SIM dual standby (DSDS) device, the multiple SIMs share a single radio frequency (RF) resource, and thus when the RF resource is allocated to one SIM, an RF resource allocation gap of the other SIM may occur. Due to the RF resource allocation gap of the other SIM, the multi-SIM device may not receive a certain signal for maintaining uplink synchronization established in previous wireless communication using the other SIM so that an uplink timing synchronization procedure is needed to be performed again, thereby causing waste of the RF resource.

SUMMARY

The inventive concepts provide a multi-subscriber identity module (SIM) device capable of performing wireless communications by efficiently using a limited radio frequency (RF) resource and/or operation methods thereof.

According to an example embodiment of the inventive concepts, a multi-SIM device may include a first SIM for first wireless communication, a second SIM for second wireless communication, and a processor configured to allocate a radio frequency (RF) resource to any one of the first and second SIMs, control first uplink time alignment of the first wireless communication by allocating the RF resource to the first SIM, and adjust a first time alignment timer for the first uplink time alignment based on an RF resource allocation gap of the first SIM when the RF resource is allocated from the first SIM to the second SIM, and the RF resource is reallocated from the second SIM to the first SIM.

According to another example embodiment of the inventive concepts, an operation method of a multi-SIM device including a first SIM and a second SIM may include performing first wireless communication with a first base station by using an RF resource allocated to the first SIM, allocating the RF resource to the second SIM, performing second wireless communication with a second base station by using the RF resource allocated to the second SIM, reallocating the RF resource to the first SIM, and adjusting a first time alignment timer for first uplink time alignment in the first wireless communication based on an RF resource allocation gap of the first SIM.

According to another example embodiment of the inventive concepts, a multi-SIM device may include a plurality of SIMs, and a processor configured to allocate a radio frequency (RF) resource to any one of the plurality of SIMs, perform wireless communication with a base station by allocating the RF resource to a target SIM among the plurality of SIMs, and adjust a time alignment timer related to release of a physical uplink control channel (PUCCH) scheduling request (SR) resource set in the wireless communication by considering an RF resource allocation gap of the target SIM when the RF resource is allocated from the target SIM to another SIM among the plurality of SIMs and the RF resource is reallocated from the different SIM to the target SIM.

BRIEF DESCRIPTION OF THE DRAWINGS

Some example embodiments of the inventive concepts will be more clearly understood from the following detailed description taken in conjunction with the accompanying drawings in which:

FIGS. 3A and 3B are block diagrams of wireless networks usable through first and second subscriber identity modules (SIMs);

DETAILED DESCRIPTION

Hereinafter, some embodiments of the inventive concepts will be described in detail with reference to the accompanying drawings.

Figure 1:
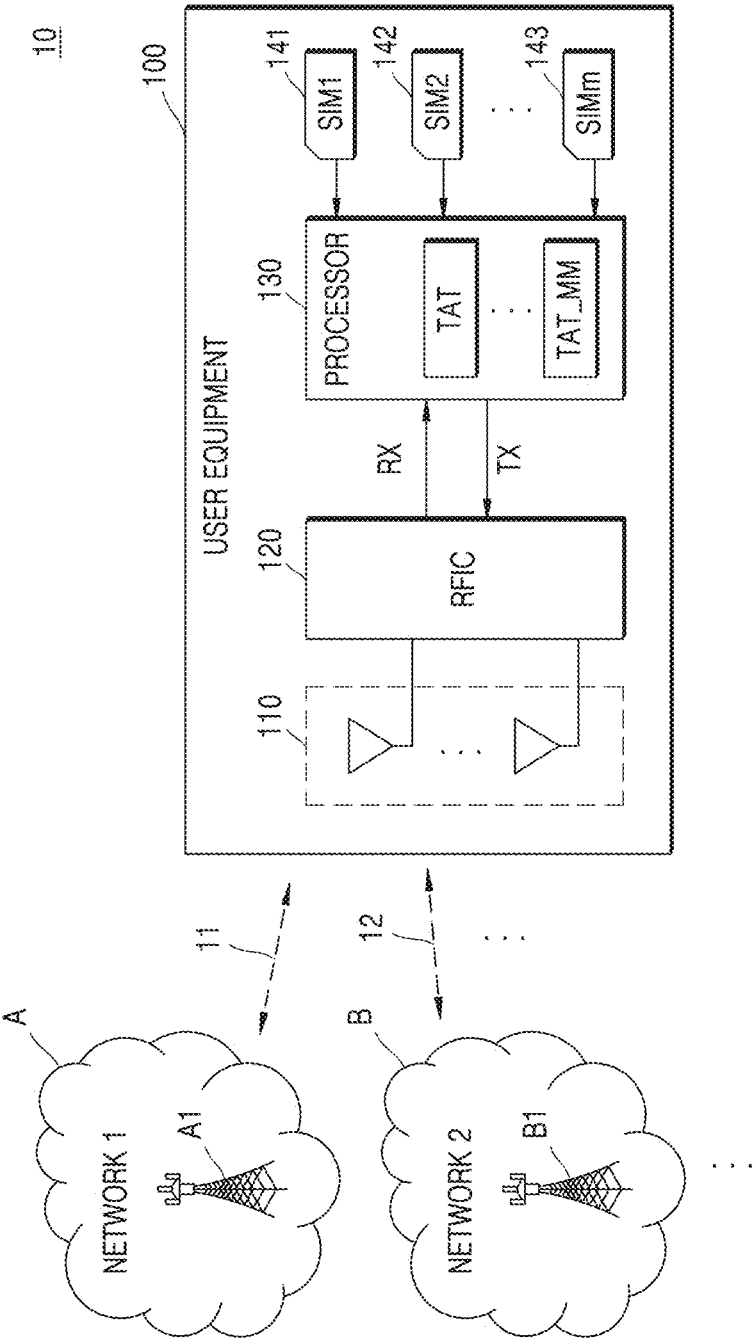
FIG. 1 is a block diagram of a wireless communication system according to an example embodiment of the inventive concepts.

FIG. 1 is a block diagram of a wireless communication system 10 according to an example embodiment of the inventive concepts. As shown in FIG. 1, the wireless communication system 10 may include a user equipment (UE) 100, a first network A, a second network B, and the like.

The UE 100 is a wireless communication device, may be stationary or mobile, and may be referred to as a random device capable of transmitting and receiving data and/or control information by wirelessly communicating with a first or second base station A1 or B1. For example, the UE 100 may be referred to as a multi-subscriber identity module (SIM) device, a wireless communication device, a terminal, a terminal equipment, a mobile station (MS), a mobile terminal (MT), a user terminal (UT), a subscriber station (SS), a handheld device, or the like.

The UE 100 may include an antenna array 110, a radio frequency integrated circuit (RFIC) 120, a processor 130, and m SIMs, e.g., first, second, . . . , and mth SIMs 141, 142, . . . , and 143 (m is an integer greater than 1).

The first or second base station A1 or B1 may be referred to as a fixed station configured to communicate with the UE 100 and/or another base station and may exchange data and control information by communicating with the UE 100 and/or another base station. For example, a base station may be referred to as a cell, a Node B, an evolved Node B (eNB), a next generation Node B (gNB), a sector, a site, a base transceiver system (BTS), an access point (AP), a relay node, a remote radio head (RRH), a radio unit (RU), a small cell, or the like. In the specification, a base station or a cell may be analyzed as an inclusive meaning indicating a partial region or function covered by a base station controller (BSC) in code division multiple access (CDMA), a Node B in wideband CDMA (WCDMA), an eNB in long term evolution (LTE), a gNB or a sector (site) in fifth generation new radio (5G NR), or the like, and may cover various coverage areas such as communication coverages of a mega cell, a macro cell, a micro cell, a pico cell, a femto cell, a relay node, an RRH, an RU, and a small cell.

The first base station A1 may be included in the first network A, and the second base station B1 may be included in the second network B. The UE 100 may access the first network A through the first base station A1 and access the second network B through the second base station B1. The UE 100 may communicate with the first network A and the second network B based on arbitrary radio access technology (RAT). For example, the UE 100 may communicate with the first network A and the second network B based on a 5G system, a 5G NR system, an LTE system, a CDMA system, a global system for mobile communications (GSM) system, a wireless local area network (WLAN) system, or another arbitrary RAT. The UE 100 may communicate with the first network A and the second network B based on the same RAT in some example embodiments and communicate with the first network A and the second network B based on different RATs in other some example embodiments.

The UE 100 may support wireless communication using multiple SIMs. For example, the UE 100 may perform first wireless communication 11 with the first base station A1 included in the first network A by using the first SIM 141 and perform second wireless communication 12 with the second base station B1 included in the second network B by using the second SIM 142. The first and second wireless communications 11 and 12 may be referred to as first and second network communications, respectively. For example, when performing the first and second wireless communications 11 and 12 corresponding to the first and second SIMs 141 and 142, respectively, the UE 100 may be referred to as a dual SIM device. The first and second wireless communications 11 and 12 may be referred to as first and second connections or first and second subscriptions, respectively. Some example embodiments of the inventive concepts will be described by mainly referring to the first and second SIMs 141 and 142 (e.g., dual SIM wireless communication) as shown in FIG. 1, but it would be understood that example embodiments of the inventive concepts may also be applied to multi-SIM based wireless communication using three or more SIMs, and an example embodiment of the multi-SIM based wireless communication using three or more SIMs will be described below with reference to FIG. 13.

In an example embodiment, the UE 100 may support a dual SIM dual standby (DSDS) mode, and in this case, the UE 100 may be referred to as a DSDS device. The two or more SIMs (e.g., the first, second, . . . and mth SIMs 141, 142, . . . , and 143) in the UE 100 may share the RFIC 120. The RFIC 120 may provide an RF path for the first and second wireless communications 11 and 12 and may be referred to as an RF resource.

In an example embodiment, when the RFIC 120 is shared by the first and second SIMs 141 and 142 in the UE 100, each of the first and second wireless communications 11 and 12 may exclusively use the RFIC 120, and accordingly, one of the first and second wireless communications 11 and 12 may be suspended. For example, the UE 100 may perform the first wireless communication 11 by using the RFIC 120, and when the UE 100 transits to a sleep state in a discontinuous reception mode, the UE 100 may perform the second wireless communication 12 by using the RFIC 120, and accordingly, the first wireless communication 11 may be suspended. Hereinafter, allocating an RF resource to an arbitrary SIM may indicate performing a control so that wireless communication corresponding to the arbitrary SIM uses the RFIC 120.

The antenna array 110 may include at least one antenna and receive an RF signal from the first base station A1 and the second station B1 or transmit an RF signal to the first base station A1 and the second station B1. In some example embodiments, the antenna array 110 may include a plurality of antennas for multi-input multi-output (MIMO).

The RFIC 120 is hardware connected to the antenna array 110 and the processor 130 and may provide an RF path for wireless communication. For example, the RFIC 120 may be referred to as a transceiver, process an RF signal received from the antenna array 110 to provide a reception signal RX as a baseband signal to the processor 130, and process a transmission signal TX as a baseband signal to provide an RF signal to the antenna array 110. The RFIC 120 may be controlled by the processor 130 and include, as a non-limiting example, switches, matching circuits, filters, amplifiers, mixers, an analog to digital converter (ADC), a digital to analog converter (DAC), and the like.

In some example embodiments, the RFIC 120 may support carrier aggregation (CA) using a plurality of carriers. For example, the UE 100 may transmit or receive data to or from the first base station A1 or the second base station B1 by simultaneously using two or more carriers referred to as component carriers (CCs). The RFIC 120 may form RF paths corresponding to CCs used for CA and process signals transmitted and received through the RF paths.

The processor 130 may communicate with the RFIC 120 through the baseband signals RX and TX and be coupled to the first, second, . . . , and mth SIMs 141, 142, . . . , and 143. For example, the first SIM 141 may include information for accessing the first network A by performing the first wireless communication 11, and the second SIM 142 may include information for accessing the second network B by performing the second wireless communication 12. For example, the processor 130 may have an architecture configured to process access associated with the first SIM 141 and access associated with the second SIM 142. In some example embodiments, the processor 130 may include a hardware block designed through logic synthesis, a software block including a series of instructions, a processing unit including at least one processor configured to execute the series of instructions, and a combination thereof. In some example embodiments, the processor 130 may be referred to as a modem or a baseband processor.

In an example embodiment, the processor 130 may include a time alignment timer TAT and a time alignment timer management module TAT_MM. For example, the processor 130 may perform a random access procedure with the first base station A1 to form uplink synchronization in an initial stage of the first wireless communication 11. Thereafter, the processor 130 may receive a timing advance command from the first base station A1 and correct transmission timing of uplink data based on the timing advance command. The correcting of the transmission timing of the uplink data may be defined as an uplink time alignment operation. For example, the timing advance command includes offset information for transmission timing correction, and the processor 130 may perform an uplink time alignment by using the offset information, so that the first base station A1 receives uplink data from the UE 100 at scheduled timing.

In addition, when the processor 130 does not receive the timing advance command from the first base station A1 within a certain time, the processor 130 may determine that uplink synchronization with the first base station A1 is lost, release a physical uplink control channel (PUCCH) scheduling request (SR) resource set by the first base station A1, and perform the random access procedure again. The processor 130 may check whether the timing advance command has been received within the certain time, by using the time alignment timer TAT. That is, when the processor 130 does not receive the timing advance command before the time alignment timer TAT expires, the processor 130 may determine that uplink synchronization with the first base station A1 is lost. When the processor 130 receives the timing advance command before the time alignment timer TAT expires, the processor 130 may restart the time alignment timer TAT in response to the timing advance command and perform an uplink time alignment.

When the RF resource is allocated to the second SIM 142 (e.g., when the limited RFIC 120 is used for the second wireless communication 12), the first wireless communication 11 is suspended, and thus, it may be difficult for the processor 130 to receive the timing advance command from the first base station A1, and even when the RF resource is reallocated to the first SIM 141 thereafter (e.g., even when the RFIC 120 is used for the first wireless communication 11 again), it may be difficult to receive the timing advance command from the first base station A1 before the time alignment timer TAT expires because the time alignment timer TAT almost expires or has already expired.

By considering this difficulty, the time alignment timer management module TAT_MM according to an example embodiment may adjust the time alignment timer TAT based on a suspension period of the first wireless communication 11 (or an RF resource allocation gap of the first SIM 141). The time alignment timer TAT may be used to perform an uplink time alignment of the second wireless communication 12 corresponding to the second SIM 142, or a separate time alignment timer may be further included to perform the uplink time alignment of the second wireless communication 12.

In an example embodiment, the time alignment timer management module TAT_MM may extend an expiry time of the time alignment timer TAT by the suspension period of the first wireless communication 11 (or the RF resource allocation gap of the first SIM 141).

In an example embodiment, the time alignment timer management module TAT_MM may extend the expiry time of the time alignment timer TAT by a time matched with a type of process performed by the second wireless communication 12 (or a process type performed by allocating the RF resource to the second SIM 142).

Besides the above, the time alignment timer management module TAT_MM may adjust the time alignment timer TAT in various manners so that the UE 100 operating as a DSDS device does not perform an undesired random access procedure. Some example embodiments of the various manners will be described below.

Although the aforementioned embodiments have been described mainly with reference to the first wireless communication 11 corresponding to the first SIM 141, this is merely to help understanding, and thus, the technical idea of some example embodiments of the inventive concepts is also clearly applicable to the second wireless communication 12 corresponding to the second SIM 142.

The UE 100 according to an example embodiment of the inventive concepts may adjust the time alignment timer TAT by considering an RF resource allocation gap of a random SIM, which occurs due to a limited RF resource, so that an undesired random access procedure is mitigated or prevented, thereby efficiently using the RF resource.

Figure 2:
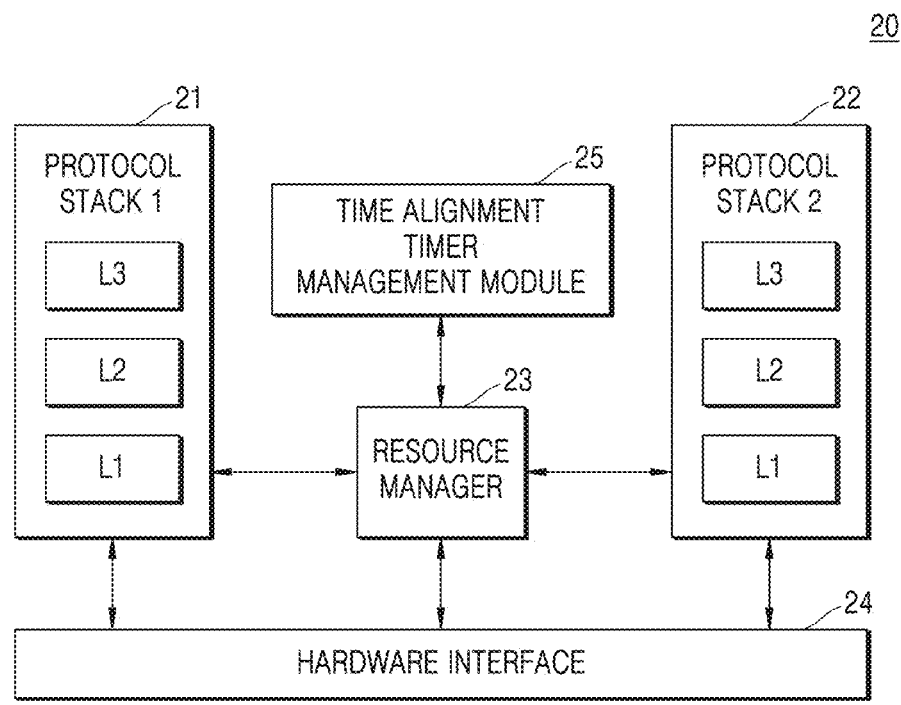
FIG. 2 is a block diagram of a protocol stack system according to an example embodiment of the inventive concepts.

FIG. 2 is a block diagram of a protocol stack system 20 according to an example embodiment of the inventive concepts. For example, FIG. 2 illustrates a control plane of first and second protocol stacks 21 and 22 included in the protocol stack system 20. In some example embodiments, the protocol stack system 20 may be implemented in the processor 130 of FIG. 1, and the processor 130 may perform operations for wireless communication based on the protocol stack system 20. At least some of the blocks shown in FIG. 2 may be implemented by hardware logic, or implemented by a software module executed by at least one processor in another example embodiment. Hereinafter, FIG. 2 will be described with reference to FIG. 1.

Referring to FIG. 2, the protocol stack system 20 may include the first and second protocol stacks 21 and 22 corresponding to the first and second SIMs 141 and 142, respectively, a resource manager 23, a hardware interface 24, and a time alignment timer management module 25.

Each of the first and second protocol stacks 21 and 22 may support arbitrary RAT. A detailed description thereof will be made below with reference to FIGS. 3A and 3B.

In some example embodiments, the first and second protocol stacks 21 and 22 may interact with a shared higher layer (e.g., an application layer), and the high layer may obtain information about the first and second wireless communications 11 and 12 or provide an interface for programs which provide commands. The high layer may be implemented in the processor 130 or another device separated from the processor 130.

The protocol stack system 20 may include the hardware interface 24 shared by the first and second protocol stacks 21 and 22. The hardware interface 24 may provide an interface for hardware (e.g., the RFIC 120 of FIG. 1), and the first and second protocol stacks 21 and 22 may provide or obtain a signal to or from the RFIC 120 through the hardware interface 24. In some example embodiments, the hardware interface 24 may be referred to as a driver for the RFIC 120.

Each of the first and second protocol stacks 21 and 22 for a control plane may include a plurality of layers. As shown in FIG. 2, the first protocol stack 21 may include a first layer L1, a second layer L2, and a third layer L3, and the first layer L1, the second layer L2, and the third layer L3 may correspond to lower three layers of an open system interconnection (OSI) model. For example, in LTE, 5G NR, or the like, a physical (PHY) layer may be included in the first layer L1, a media access control (MAC) layer, a radio link control (RLC) layer, and a packet data convergence protocol (PDCP) layer may be included in the second layer L2, and a radio resource control (RRC) layer and a non-access stratum (NAS) layer may be included in the third layer L3. Like the first protocol stack 21, the second protocol stack 22 may also include the first layer L1, the second layer L2, and the third layer L3. In the specification, the first protocol stack 21 may correspond to the first SIM 141, wherein performing an operation by the first protocol stack 21 is referred to as performing the operation by the first SIM 141, and the second protocol stack 22 may correspond to the second SIM 142, wherein performing an operation by the second protocol stack 22 is referred to as performing the operation by the second SIM 142.

The resource manager 23 may manage a resource to be provided to the first wireless communication 11 by the first protocol stack 21 and to the second wireless communication 12 by the second protocol stack 22. In an example embodiment, the resource manager 23 may select any one of the first and second SIMs 141 and 142 and allocate an RF resource such as the RFIC 120 to the selected SIM.

In an example embodiment, the time alignment timer management module 25 may obtain, from the resource manager 23, resource management information about to which one of the first and second protocol stacks 21 and 22 the RF resource has been allocated, and may be aware of an RF resource allocation gap of each of the first and second protocol stacks 21 and 22 based on the resource management information.

In an example embodiment, the time alignment timer management module 25 may adaptively adjust the time alignment timer TAT used to check whether uplink synchronization of the first and second wireless communications 11 and 12 is established, by considering the RF resource allocation gap of each of the first and second protocol stacks 21 and 22.

For example, when the RF resource allocated to the first protocol stack 21 is allocated to the second protocol stack 22 and then reallocated to the first protocol stack 21, the time alignment timer management module 25 may adjust the time alignment timer TAT to maintain uplink synchronization of the first wireless communication 11 based on the RF resource allocation gap of the first protocol stack 21. In some example embodiments, the time alignment timer management module 25 may adjust the time alignment timer TAT based on a time for which the second protocol stack 22 has used the RF resource.

The time alignment timer management module 25 may be stored in a memory in a program form as a software module executable by at least one processor, or be a hardware module designed by logic synthesis in some example embodiments.

FIGS. 3A and 3B are block diagrams of wireless networks 200a and 200b usable through first and second SIMs 212 and 214.

FIG. 3A is a block diagram of the wireless network 200a usable through the first SIM 212. The wireless network 200a, which is usable, may include an LTE wireless network (or a 5G wireless network) and a legacy wireless network. The legacy wireless network may be a second generation (2G)/third generation (3G) network. The LTE wireless network may be referred to as a network on a packet switched (PS) domain, and the legacy wireless network may be referred to as a network on a circuit switched (CS) domain. Referring to FIG. 3A, an evolved packet core (EPC) network 230 may include a serving gateway (SGW) 231, a mobility management entity (MME) 232, a home subscriber server (HSS) 233, and first and second packet data network gateways (PDN-GWs) 235 and 234.

In the LTE wireless network, a UE 210 may be connected to an evolved-universal mobile telecommunications system (UMTS) terrestrial radio access network (E-UTRAN) 220 including a plurality of eNodes (or LTE base stations). The E-UTRAN 220 may be connected to the SGW 231 and the MME 232. The MME 232 connected to the SGW 231 may manage tracking of the UE 210, paging, and security of the E-UTRAN 220 in the EPC network 230. The MME 232 may be connected to the HSS 233 capable of supporting a database including subscriber subscription, profile, and authentication information.

The SGW 231 may route packet data for the UE 210 through an Internet protocol (IP) network 240. The IP network 240 may include an Internet packet data network 242 and an IP multimedia subsystem (IMS) packet data network 244. The UE 210 may access the Internet packet data network 242 so as for a user to use a data service, and access the IMS packet data network 244 so as for the user to use an IMS service. The first PDN-GW 235 may route Internet packet data by forming a connection between the EPC network 230 and the Internet packet data network 242 connected to a plurality of Internet servers. The second PDN-GW 234 may route IMS packet data by forming a connection between the EPC network 230 and the IMS packet data network 244 connected to an IMS. By doing this, the user may use the data service and the IMS service (e.g., an IMS call or voice over LTE (VoLTE)) through the LTE wireless network. That is, the UE 210 may access the LTE wireless network through the first SIM 212, and as a result, the user may use the data service and the IMS service.

In the legacy wireless network, the UE 210 may be connected to a radio access network (RAN) 250 including a plurality of eNodes (or base stations). The UE 210 may be configured to independently access various wireless networks providing at least a voice service, through a public switched telephone network (PSTN) 270. For example, the UE 210 may access a CS core network 260 through the RAN 250, and the user may use a CS-based voice service through the PSTN 270. That is, the UE 210 may access the PSTN 270 by using the first SIM 212, and as a result, the user may use the CS-based voice service.

FIG. 3B is a block diagram of the wireless network 200b usable through the second SIM 214. The wireless network 200b, which is usable, may include an LTE wireless network (or a 5G wireless network). Compared to the wireless network 200a of FIG. 3A, the wireless network 200b of FIG. 3B cannot provide the legacy wireless network. Referring to FIG. 3B, the UE 210 may access the IP network 240 through the E-UTRAN 220 and the EPC network 230 by using the second SIM 214, and as a result, the user may use the data service and the IMS service. However, the user cannot use the CS-based voice service through the PSTN 270.

The wireless networks 200a and 200b usable based on the first and second SIMs 212 and 214 in FIGS. 3A and 3B are merely some example embodiments and thus are not limited thereto, and as described above, the UE 210 may provide at least one wireless network based on the same RAT or provide at least one wireless network based on different RATs, respectively, through the first and second SIMs 212 and 214.

Figure 4:
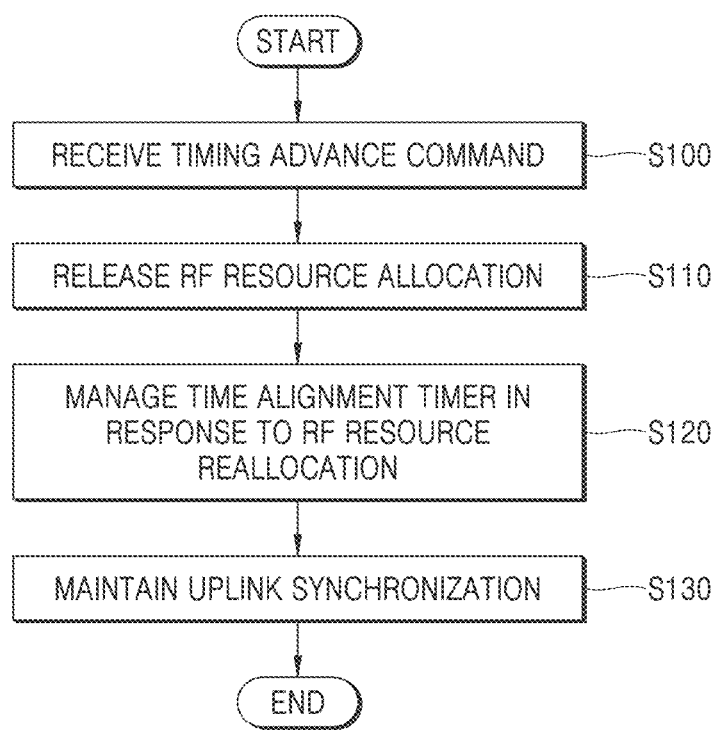
FIG. 4 is a flowchart of an operation method of a multi-SIM device, according to an example embodiment of the inventive concepts.

FIG. 4 is a flowchart of an operation method of a multi-SIM device, according to an example embodiment of the inventive concepts. Hereinafter, it is premised that the multi-SIM device may be a UE in FIGS. 1 to 3B, may include first and second SIMs, and perform first wireless communication with a first base station by allocating an RF resource to the first SIM at present.

Referring to FIG. 4, in operation S100, the multi-SIM device may receive a timing advance command from the first base station while performing the first wireless communication. In an example embodiment, the multi-SIM device may restart a time alignment timer in response to the timing advance command and perform an uplink time alignment with the first base station based on the timing advance command.

In operation S110, the multi-SIM device may release the allocation of the RF resource to the first SIM. In an example embodiment, the multi-SIM device may operate in the discontinuous reception mode in the first wireless communication. In the discontinuous reception mode, the multi-SIM device may be in the sleep state or a wake-up state, and the multi-SIM device may monitor and process a paging channel to receive a paging message in the wake-up state and transit to the sleep state when additional communication is not desired. In this case, when the multi-SIM device transits to the sleep state with respect to the first wireless communication, the multi-SIM device may respond to a request of a second protocol stack corresponding to a second SIM or allocate the RF resource to the second SIM based on an RF resource allocation scheduling result. The multi-SIM device may perform second wireless communication with a second base station by using the second SIM and the RF resource.

In operation S120, the multi-SIM device may reallocate the RF resource to the first SIM and manage the time alignment timer that is used to check uplink synchronization of the first wireless communication in response to the RF resource reallocation. In addition, the multi-SIM device may transit from the sleep state to the wake-up state in the first wireless communication. In an example embodiment, the multi-SIM device may adjust the time alignment timer based on an RF resource allocation gap of the first SIM between operations S110 and S120. For example, the multi-SIM device may further give an opportunity to receive the timing advance command by extending an expiry time of the time alignment timer in various manners or forcedly restarting an expired time alignment timer to compensate for non-securement of a sufficient time to receive the timing advance command from the first base station due to the RF resource allocation gap of the first SIM.

In operation S130, the multi-SIM device may maintain the uplink synchronization of the first wireless communication by using the adjusted time alignment timer. In an example embodiment, the multi-SIM device may transmit a scheduling request through a PUCCH SR resource set to allocate a channel resource for transmitting data to the first base station. In an example embodiment, the multi-SIM device may restart the adjusted time alignment timer when the timing advance command is received from the first base station, and when the time alignment timer has an extended expiry time, the extended expiry time may be reset to the original expiry time. In an example embodiment, when the multi-SIM device does not receive a scheduling approval from the first base station in response to the scheduling request, or when the adjusted time alignment timer expires, the multi-SIM device may determine that the uplink synchronization is lost, release the set PUCCH SR resource, and perform the random access procedure with the first base station.

Figure 5A:
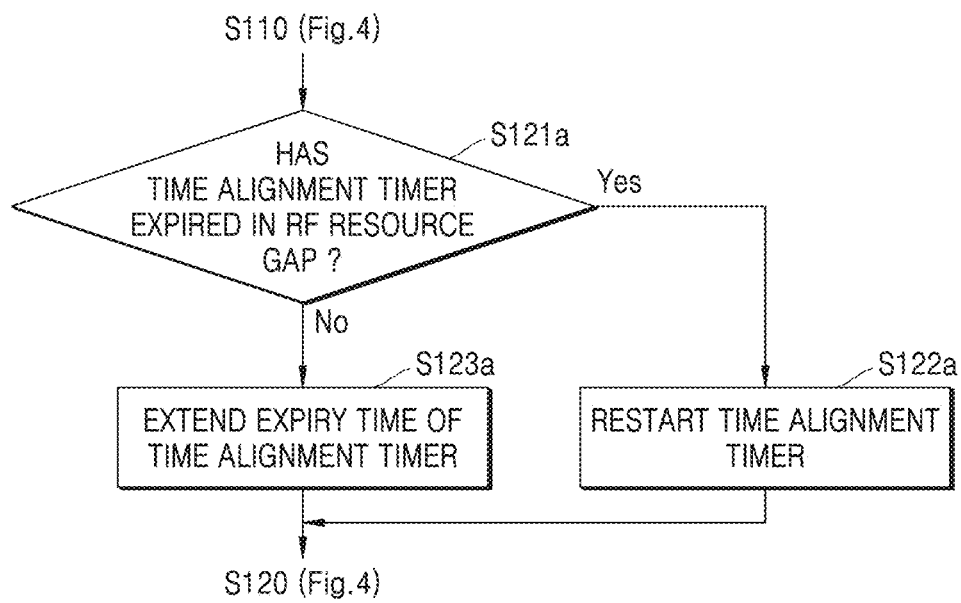
FIGS. 5A and 5B are flowcharts of operation S120 of FIG. 4, according to some example embodiments of the inventive concepts.
Figure 5B:
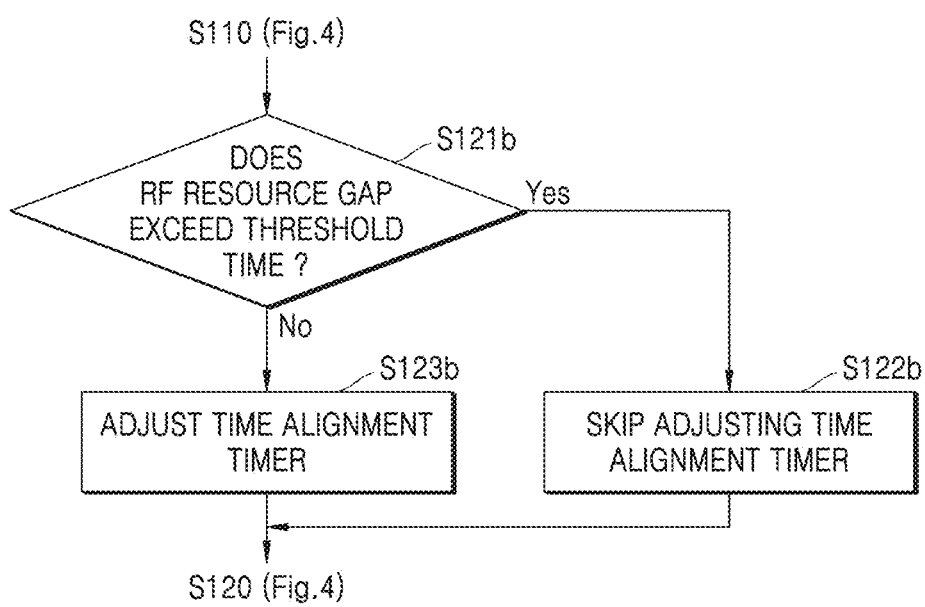

FIGS. 5A and 5B are flowcharts of operation S120 of FIG. 4, according to some example embodiments of the inventive concepts.

Referring to FIG. 5A, in operation S121a next to operation S110 (of FIG. 4), the multi-SIM device may check whether the time alignment timer has expired in the RF resource allocation gap of the first SIM.

When operation S121a is 'Yes', in operation S122a, the multi-SIM device may restart the time alignment timer expired in the RF resource allocation gap of the first SIM.

When operation S121a is 'No', in operation S123a, the multi-SIM device may extend an expiry time of the time alignment timer. In an example embodiment, the multi-SIM device may extend the expiry time of the time alignment timer by a time matched with the RF resource allocation gap of the first SIM.

The multi-SIM device according to an example embodiment of the inventive concepts may perform operations S121a to S123a to restart the time alignment timer expired in the RF resource allocation gap of the first SIM or extend the expiry time of the time alignment timer after reallocating the RF resource to the first SIM. By doing this, the multi-SIM device may maintain the uplink synchronization of the first wireless communication as long as possible, thereby reducing or minimizing an undesired random access procedure.

Referring to FIG. 5B, in operation S121b, the multi-SIM device may check whether the RF resource allocation gap of the first SIM exceeds a threshold time.

When operation S121b is 'Yes', in operation S122b, the multi-SIM device may skip adjusting the time alignment timer. That is, when the RF resource allocation gap of the first SIM exceeds the threshold time, the multi-SIM device may determine that the uplink synchronization is lost, and quickly perform a random access procedure.

When operation S121b is 'No', in operation S123b, the multi-SIM device may adjust the time alignment timer based on the RF resource allocation gap of the first SIM.

As described above, the multi-SIM device according to an example embodiment of the inventive concepts may selectively adjust the time alignment timer according to a length of the RF resource allocation gap of the first SIM.

Figure 6:
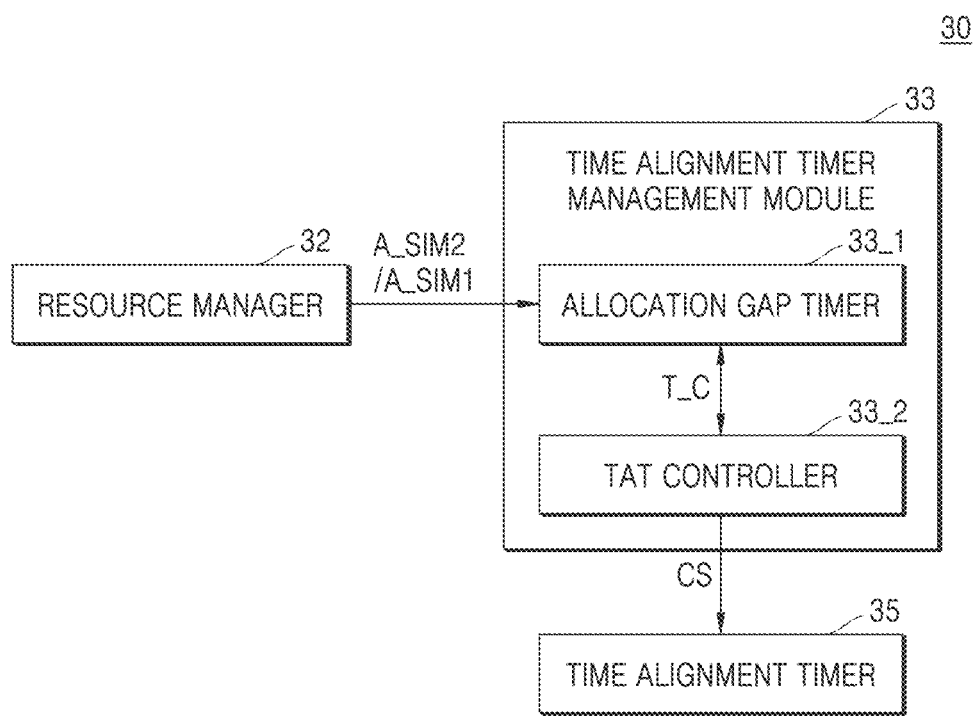
FIG. 6 is a block diagram of a protocol stack system according to an example some embodiment of the inventive concept.

FIG. 6 is a block diagram of a protocol stack system 30 according to an example embodiment of the inventive concepts. The protocol stack system 30 may be implemented by a software module executable by the processor 130 of FIG. 1, or all or a portion of the protocol stack system 30 may be hardware logic included in the processor 130 of FIG. 1, and an operation in the protocol stack system 30 may be analyzed as an operation of the processor 130 of FIG. 1.

Referring to FIG. 6, the protocol stack system 30 may include a resource manager 32, a time alignment timer management module 33, and a time alignment timer 35.

In an example embodiment, the time alignment timer management module 33 may include an allocation gap timer 33_1 and a time alignment timer controller 33_2. The allocation gap timer 33_1 may receive RF resource allocation related information of a plurality of SIMs from the resource manager 32.

For example, when an RF resource is allocated from a first SIM to a second SIM, the resource manager 32 may provide, to the allocation gap timer 33_1, first allocation information A_SIM2 informing of the RF resource allocation. The allocation gap timer 33_1 may be aware of release of the RF resource from the first SIM at present with reference to the first allocation information A_SIM2 and start to count time. Thereafter, when the RF resource is reallocated from the second SIM to the first SIM, the resource manager 32 may provide, to the allocation gap timer 33_1, second allocation information A_SIM1 informing of the RF resource reallocation. The allocation gap timer 33_1 may be aware of the reallocation of the RF resource to the first SIM at present with reference to the second allocation information A_SIM1 and end counting time. Thereafter, the allocation gap timer 33_1 may provide a counted time T_C to the time alignment timer controller 33_2.

In an example embodiment, the time alignment timer controller 33_2 may adjust the time alignment timer 35 by providing a control signal CS to the time alignment timer 35 based on the counted time T_C. For example, the time alignment timer controller 33_2 may extend an expiry time of the time alignment timer 35 by the counted time T_C. As another example, the time alignment timer controller 33_2 may generate an additional time by reflecting an offset to the counted time T_C and extend the expiry time of the time alignment timer 35 by the additional time. In an example embodiment, the offset may be changed according to a length of the counted time T_C. For example, the offset may be proportional to the counted time T_C. In another example embodiment, a certain offset may be changed according to a channel state of first wireless communication using the first SIM. For example, the offset may have a lower value as the channel state of the first wireless communication improves.

As described above, the time alignment timer management module 33 may accurately measure an RF resource allocation gap of the first SIM to obtain an additional time for maintaining uplink synchronization, and reflect the additional time to the time alignment timer 35.

Figures 7A, 7B:
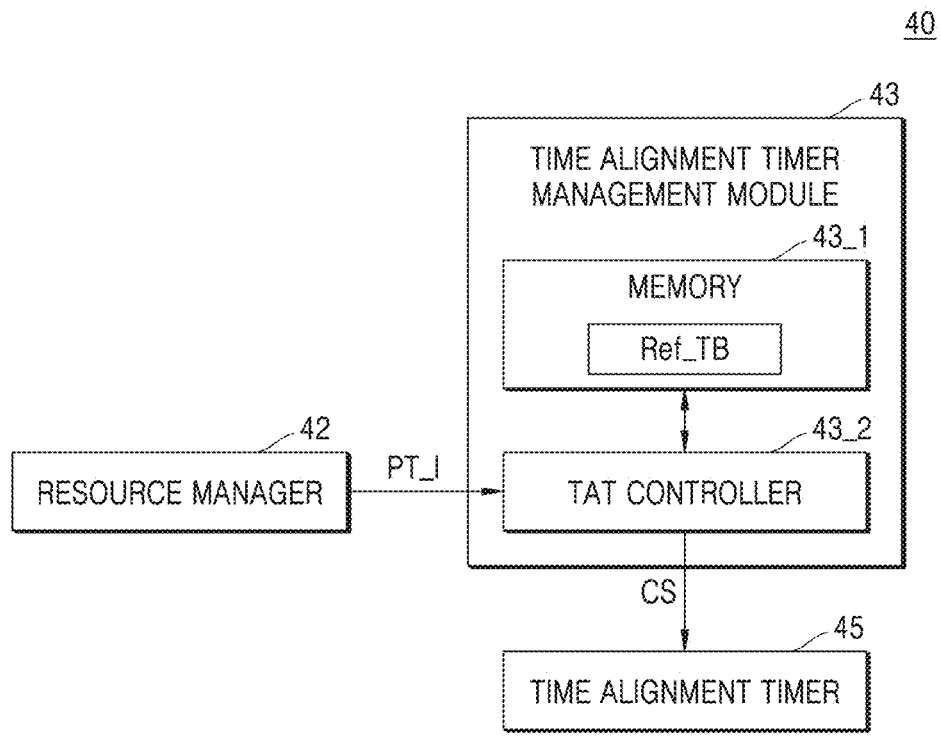
FIG. 7A is a block diagram of a protocol stack system according to an example embodiment of the inventive concepts.
FIG. 7B is a reference table of FIG. 7A.

FIG. 7A is a block diagram of a protocol stack system 40 according to an example embodiment of the inventive concepts, and FIG. 7B is a reference table Ref_TB of FIG. 7A. The protocol stack system 40 may be implemented by a software module executable by the processor 130 of FIG. 1, or all or a portion of the protocol stack system 40 may be hardware logic included in the processor 130 of FIG. 1, and an operation in the protocol stack system 40 may be analyzed as an operation of the processor 130 of FIG. 1.

Referring to FIG. 7A, the protocol stack system 40 may include a resource manager 42, a time alignment timer management module 43, and a time alignment timer 45.

In an example embodiment, the time alignment timer management module 43 may include a memory 43_1 and a time alignment timer controller 43_2. The time alignment timer controller 43_2 may receive, from the resource manager 42, information PT_1 about a type of process to be performed by using a SIM to which an RF resource is allocated.

For example, when the RF resource is allocated from a first SIM to a second SIM, the resource manager 42 may provide, to the time alignment timer controller 43_2, the information PT_1 about a type of process to be performed by using the second SIM. In an example embodiment, the type of process may include a call process, a hybrid automatic repeat request (HARQ) process, a paging process, or the like. That is, because a time for which the second SIM occupies the RF resource varies according to the type of process, this variable time may be used to adjust the time alignment timer 45.

In an example embodiment, the time alignment timer controller 43_2 may read the reference table Ref_TB stored in the memory 43_1 and obtain an additional time matched with the information PT_1 about a type of process from the reference table Ref_TB.

Referring to FIG. 7B, the reference table Ref_TB may include process type-based additional time related information. For example, a first process type Type #1 to a third process type Type #3 may be mapped to a first additional time T_EXT #1 to a third additional time T_EXT #3, respectively. However, the reference table Ref_TB shown in FIG. 7B is merely an example embodiment, and thus, the present example embodiments are not limited thereto, and more various types of process may be defined, and the reference table Ref_TB may include information about additional times mapped to the more various types of process, respectively.

Referring back to FIG. 7A, the time alignment timer controller 43_2 may generate a control signal CS for extending an expiry time of the time alignment timer 45 by the obtained additional time and provide the control signal CS to the time alignment timer 45.

As described above, the time alignment timer management module 43 may generally reflect an additional time defined according to a type of process to the time alignment timer 45, thereby reducing or minimizing desired calculations.

In another example embodiment, the time alignment timer management module 43 may adjust the time alignment timer 45 by using a reference table generated by previously setting an additional time based on a parameter by which an occupation time of the second SIM is predictable, besides a type of process.

Figure 8A:
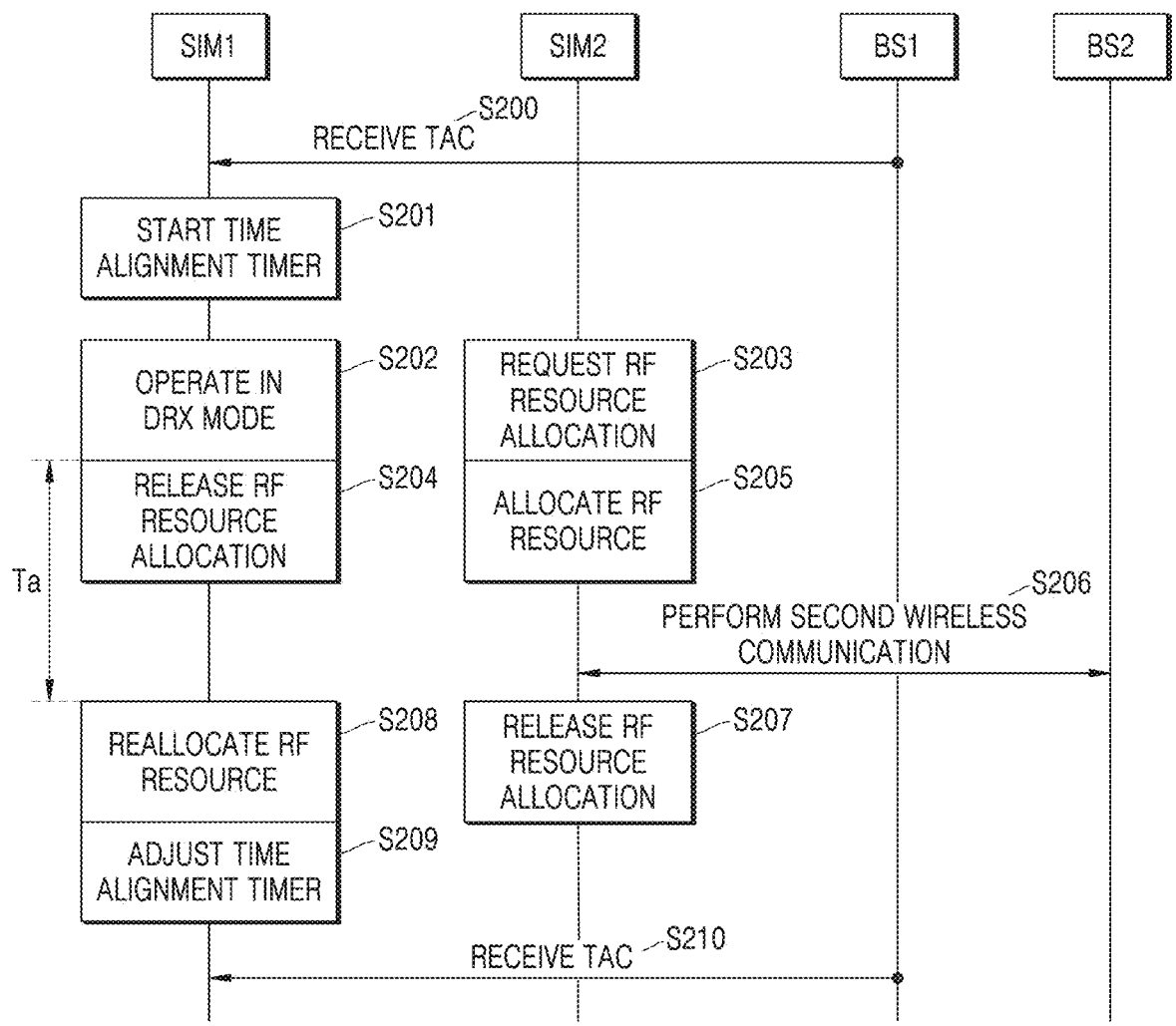
FIG. 8A is a sequence diagram of an operation method of a multi-SIM device, according to an example embodiment of the inventive concepts.
Figure 8B:
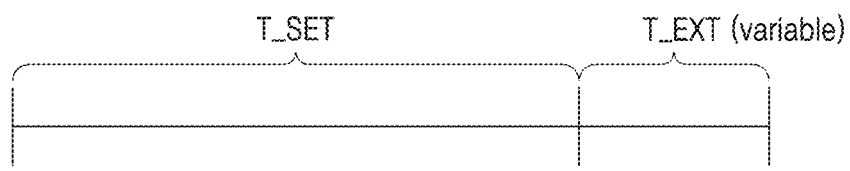
FIG. 8B illustrates a method of adjusting a time alignment timer.

FIG. 8A is a sequence diagram of an operation method of a multi-SIM device, according to an example embodiment of the inventive concepts, and FIG. 8B illustrates a method of adjusting a time alignment timer. Hereinafter, it is premised that the multi-SIM device includes a first SIM SIM1 and a second SIM SIM2, first wireless communication with a first base station BS1 is performed by using the first SIM SIM1, and second wireless communication with a second base station BS2 is performed by using the second SIM SIM2. In addition, an operation of the first SIM SIM1 and the second SIM SIM2 may be analyzed as an operation of a processor or an operation of a first protocol stack and a second protocol stack in the processor.

Referring to FIG. 8A, in operation S200, the first SIM SIM1 may receive a timing advance command (hereinafter, TAC) while performing the first wireless communication with the first base station BS1. In operation S201, the first SIM SIM1 may restart a time alignment timer in response to the TAC. In operation S202, the first SIM SIM1 may operate in the discontinuous reception mode (hereinafter, DRX mode) in the first wireless communication. In operation S204, RF resource allocation to the first SIM SIM1 may be released by a resource manager, and the first SIM SIM1 may transit to the sleep state.

In operation S203, the second SIM SIM2 may request RF resource allocation from the resource manager, and in operation S205, the resource manager may allocate an RF resource to the second SIM SIM2 in response to the request. In operation S206, the second SIM SIM2 may perform the second wireless communication with the second base station BS2. In operation S207, the resource manager may release the RF resource allocation to the second SIM SIM2.

In operation S208, the resource manager may reallocate the RF resource to the first SIM SIM1, and the first SIM SIM1 may transit to the wake-up state. In operation S209, the first SIM SIM1 may adjust the time alignment timer based on a first time Ta corresponding to an RF resource allocation gap between operations S204 and S208. In other words, the first SIM SIM1 may adjust the time alignment timer based on the RF resource allocation gap when the RF resource is allocated from the first SIM to the second SIM and the RF resource is reallocated from the second SIM to the first SIM. In an example embodiment, a length of the RF resource allocation gap may be obtained by counting time for which the RF resource is not allocated to the first SIM SIM1 or obtained by counting time for which the RF resource is allocated to the second SIM SIM2. For example, the first SIM SIM1 may extend an expiry time of the time alignment timer by the first time Ta or extend the expiry time of the time alignment timer by an additional time generated by applying an offset to the first time Ta. In operation S210, the first SIM SIM1 may receive a TAC from the first base station BS1. The first SIM SIM1 may restart the extended time alignment timer in response to the TAC and perform an uplink time alignment based on offset information for transmission timing correction, which is included in the TAC.

Referring FIG. 8B, in operation S209, the first SIM SIM1 may extend a desired (or alternatively, preset) expiry time T_SET of the time alignment timer by an additional time T_EXT. The additional time T_EXT may vary according to a length of the RF resource allocation gap between operations S204 and S208. When the time alignment timer restarts in response to the TAC received in operation S201, the time alignment timer may be reset and operate based on the desired (or alternatively, preset) expiry time T_SET.

Figure 9A:
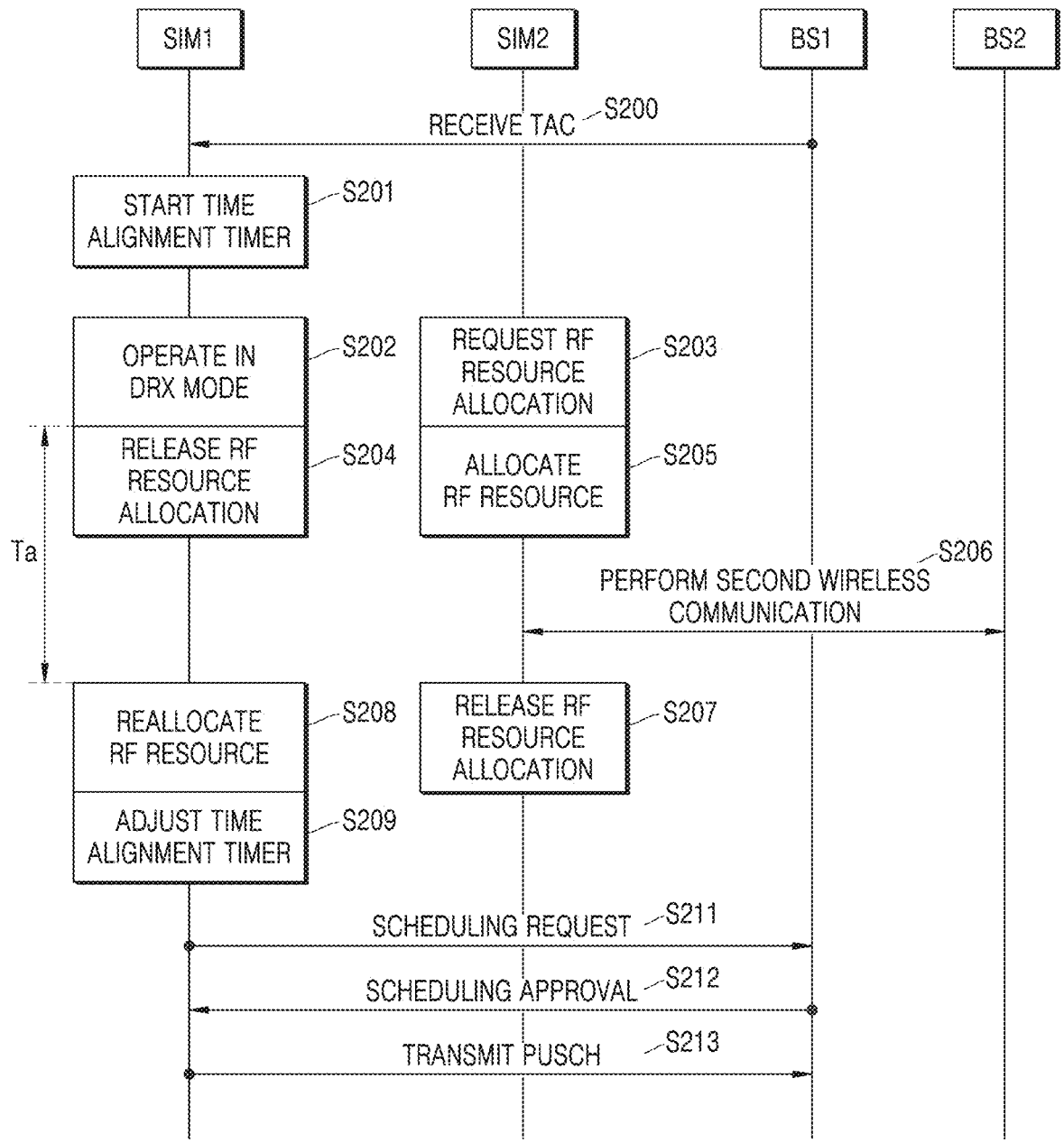
FIGS. 9A to 9C are sequence diagrams of operation methods of a multi-SIM device, according to some example embodiments of the inventive concept.
Figure 9B:
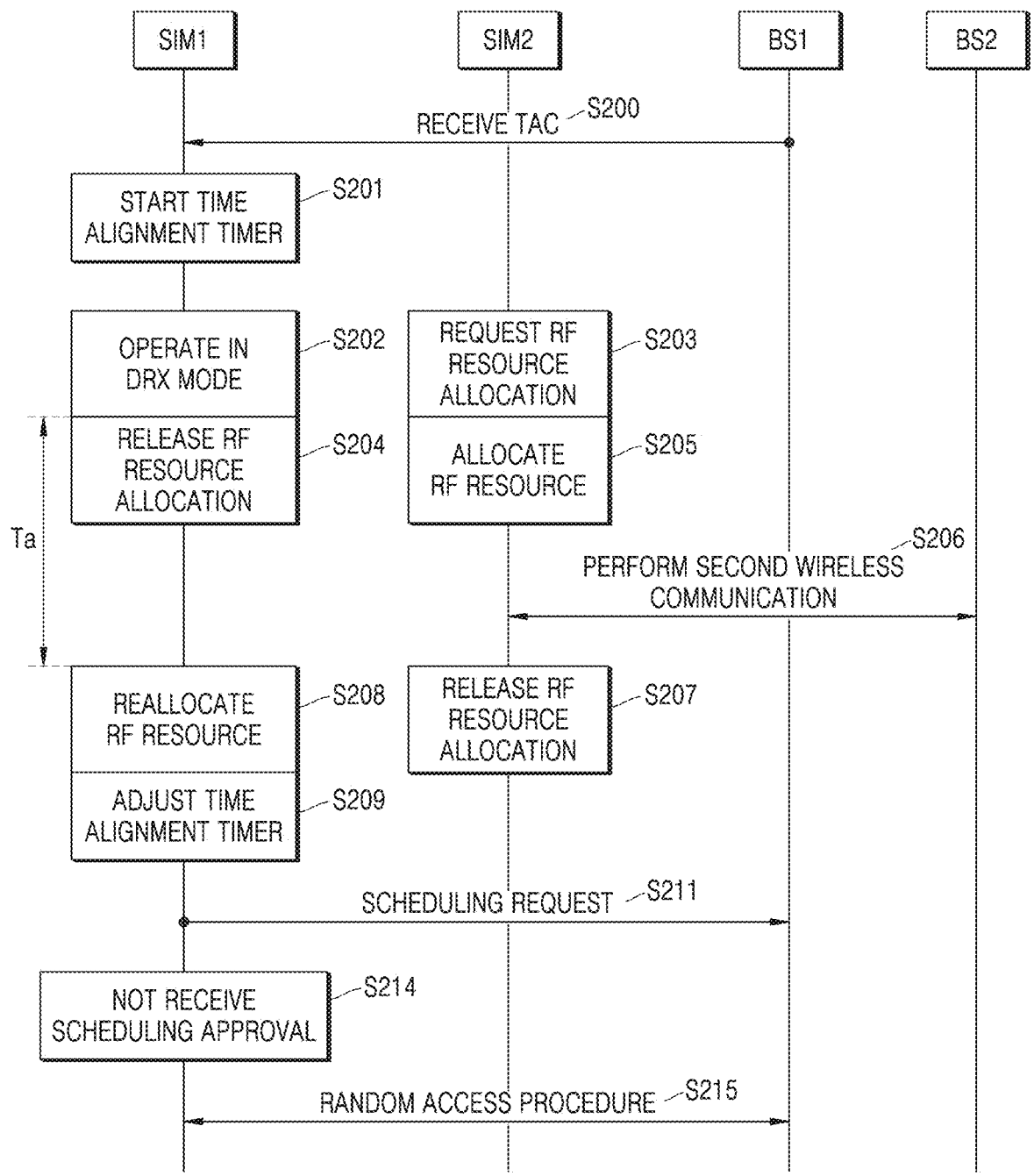
Figure 9C:
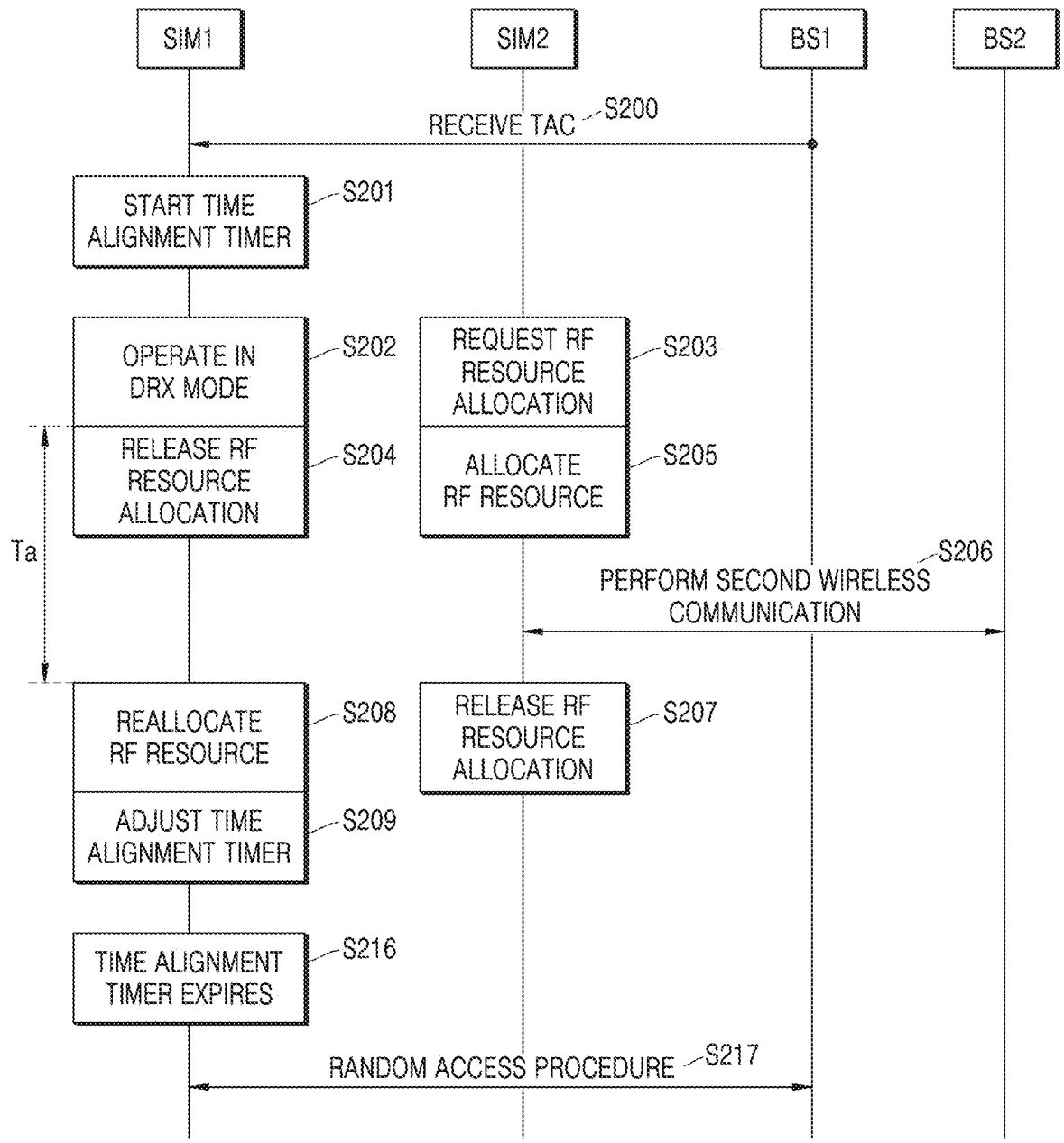

FIGS. 9A to 9C are sequence diagrams of operation methods of a multi-SIM device, according to some example embodiments of the inventive concepts. Hereinafter, a description made with reference to FIG. 8A is omitted.

Referring to FIG. 9A, in operation S211, the first SIM SIM1 may maintain uplink synchronization with the first base station BS1 and transmit a scheduling request to the first base station BS1 through a PUCCH SR resource set by the first base station BS1. In operation S212, the first SIM SIM1 may receive a scheduling approval from the first base station BS1 in response to the scheduling request. In operation S213, the first SIM SIM1 may transmit a physical uplink shared channel (PUSCH) including transmission data to the first base station BS1 based on PUSCH-related information included in the scheduling approval.

Referring to FIG. 9B, in operation S211, the first SIM SIM1 may maintain uplink synchronization with the first base station BS1 and transmit a scheduling request to the first base station BS1 through a PUCCH SR resource set by the first base station BS1. When a scheduling approval is not received from the first base station BS1 in operation S214, the first SIM SIM1 may determine that the uplink synchronization is lost and release the set PUCCH SR resource. In operation S215, the first SIM SIM1 may perform a random access procedure to form uplink synchronization with the first base station BS1 again.

Referring to FIG. 9C, when the time alignment timer adjusted in operation S209 expires, in operation S216, the first SIM SIM1 may determine that the uplink synchronization is lost and release the set PUCCH SR resource. In operation S217, the first SIM SIM1 may perform a random access procedure to form uplink synchronization with the first base station BS1 again.

Figure 10:
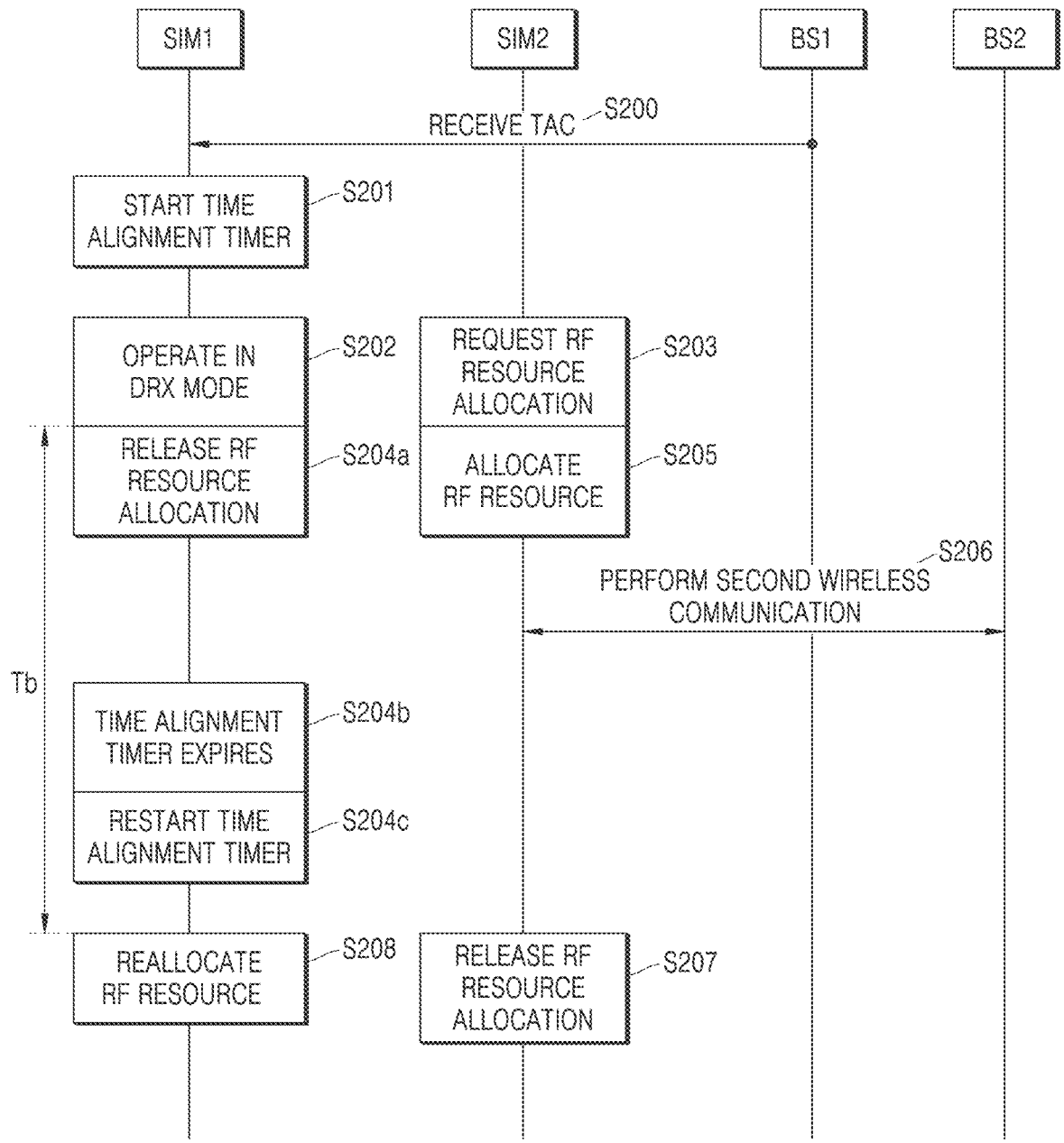
FIG. 10 is a sequence diagram of an operation method of a multi-SIM device, according to an example embodiment of the inventive concepts.

FIG. 10 is a sequence diagram of an operation method of a multi-SIM device, according to an example embodiment of the inventive concepts. Hereinafter, a description made with reference to FIG. 8A is omitted.

Referring to FIG. 10, a second time Tb corresponding to an RF resource allocation gap of the first SIM SIM1 between operations S204a and S208 may be longer than the first time Ta of FIG. 8A. Accordingly, in operation S204b, the time alignment timer may expire during the RF resource allocation gap of the first SIM SIM1. In operation S204c, the first SIM SIM1 may restart the time alignment timer. Accordingly, the first SIM SIM1 may maintain uplink synchronization with the first base station BS1.

Figure 11:
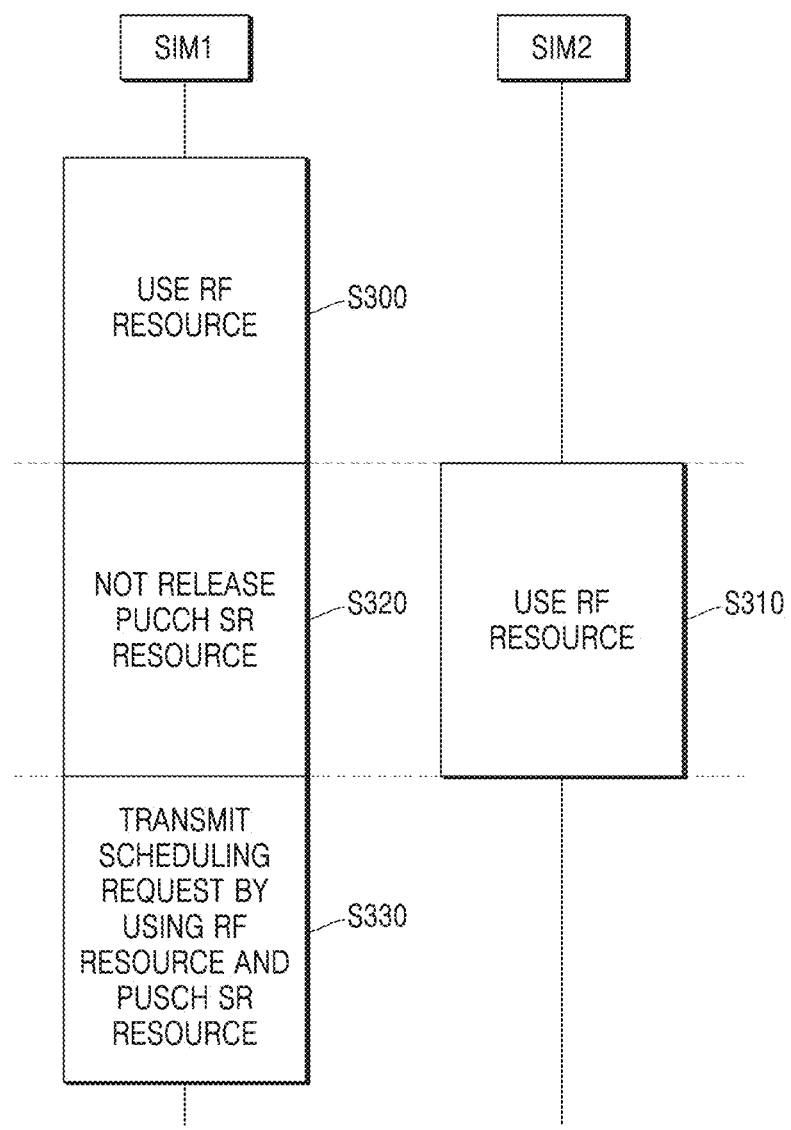
FIG. 11 is a general sequence diagram of an operation method of a multi-SIM device, according to an example embodiment of the inventive concepts.

FIG. 11 is a general sequence diagram of an operation method of a multi-SIM device, according to an example embodiment of the inventive concepts. Hereinafter, it is premised that the multi-SIM device includes first and second SIMs.

Referring to FIG. 11, in operation S300, the first SIM SIM1 may perform first wireless communication by using an RF resource allocated thereto. In operation S310, the second SIM SIM2 may perform second wireless communication by using the RF resource allocated thereto. In operation S320, the first SIM SIM1 may adjust a time alignment timer to block or prevent release of a PUCCH SR resource according to uplink synchronization due to an RF resource allocation gap. In other words, the first SIM SIM1 may adjust a time alignment timer to block or prevent release of a PUCCH SR resource during the RF resource allocation gap. That is, the first SIM SIM1 may adjust the time alignment timer to additionally obtain an opportunity for receiving a TAC from a first base station when the RF resource is reallocated to the first SIM SIM1, and by doing this, an undesired random access procedure may be reduced. In operation S330, the first SIM SIM1 may transmit a scheduling request to the first base station by using the reallocated RF resource and a PUSCH SR resource.

Figure 12:
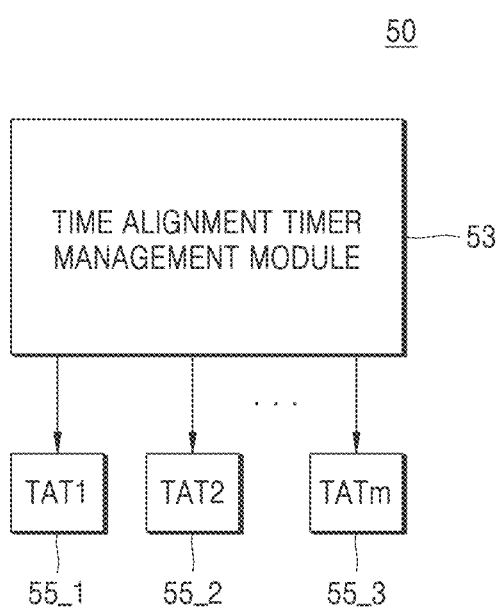
FIG. 12 is a block diagram of a protocol stack system according to an example embodiment of the inventive concepts.

FIG. 12 is a block diagram of a protocol stack system 50 according to an example embodiment of the inventive concepts.

Referring to FIG. 12, the protocol stack system 50 may include a time alignment timer management module 53 and first to mth time alignment timers 55_1, 55_2, . . . , and 55_3. The first to mth time alignment timers 55_1, 55_2, . . . , and 55_3 may correspond to the first to mth SIMs 141, 142, . . . , and 143 of FIG. 1, respectively, and may be used to check uplink synchronization of wireless communications, respectively. The time alignment timer management module 53 may individually adjust the first to mth time alignment timers 55_1, 55_2, . . . , and 55_3, according to the aforementioned example embodiments of the inventive concepts.

In an example embodiment, the time alignment timer management module 53 may adjust only some of the first to mth time alignment timers 55_1, 55_2, . . . , and 55_3 according to a wireless communication environment of the first to mth SIMs 141, 142, . . . , and 143 of FIG. 1. For example, the time alignment timer management module 53 may adjust time alignment timers only for SIMs of which a wireless communication channel state is good (e.g., a wireless communication channel state is greater than or equal to a threshold). That is, because an expiry time of a time alignment timer is extended to forcedly maintain uplink synchronization in a SIM's place, a good wireless communication environment may be desired.

Figure 13:
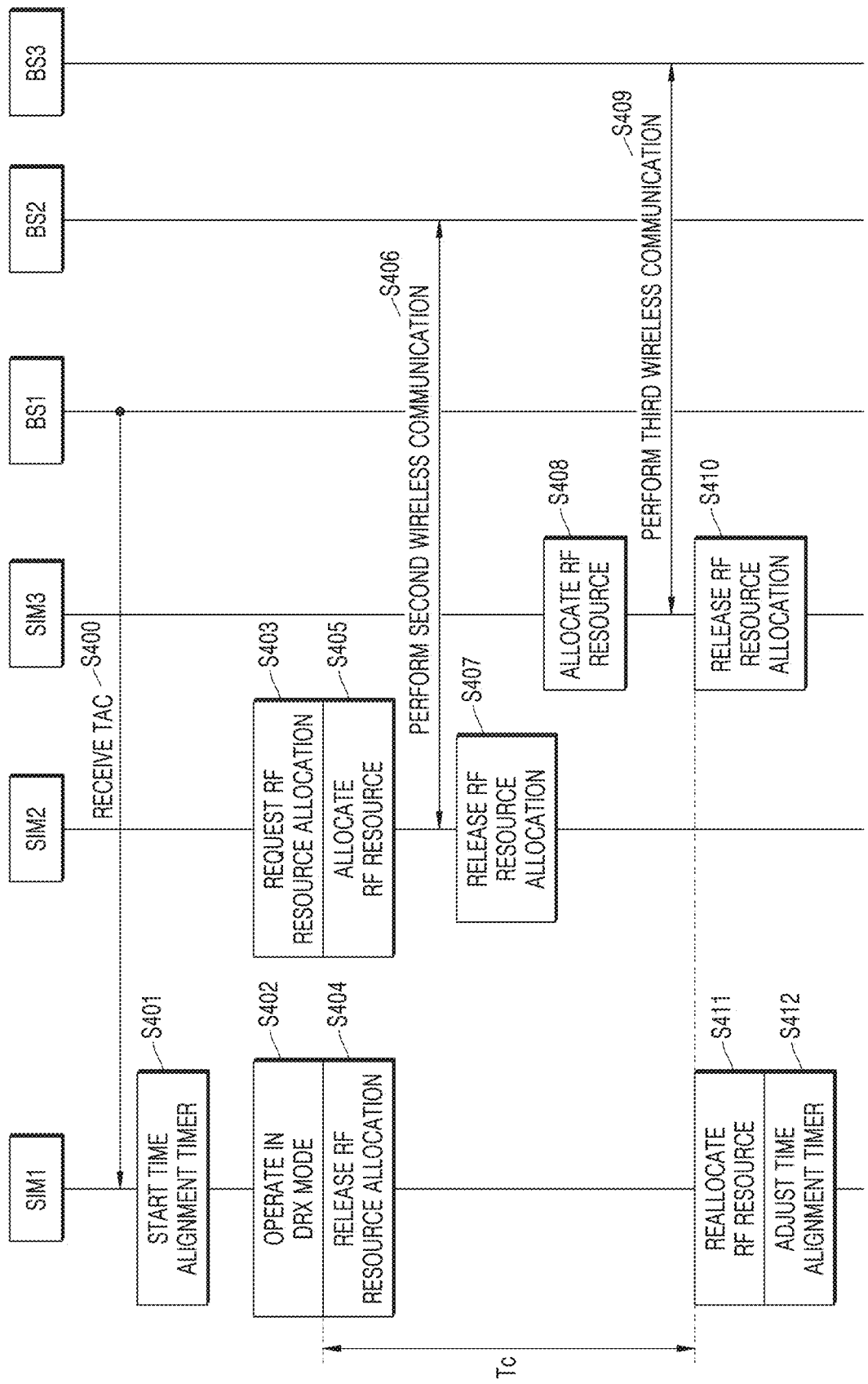
FIG. 13 is a sequence diagram of an operation method of a multi-SIM device, according to an example embodiment of the inventive concepts.

FIG. 13 is a sequence diagram of an operation method of a multi-SIM device, according to an example embodiment of the inventive concepts. Hereinafter, it is premised that the multi-SIM device includes first, second, and third SIMs SIM1, SIM2, and SIM3, first wireless communication with the first base station BS1 is performed by using the first SIM SIM1, second wireless communication with the second base station BS2 is performed by using the second SIM SIM2, and third wireless communication with a third base station BS3 is performed by using the third SIM SIM3.

Referring to FIG. 13, in operation S400, the first SIM SIM1 may receive a TAC while performing the first wireless communication with the first base station BS1. In operation S401, the first SIM SIM1 may restart a time alignment timer in response to the TAC. In operation S402, the first SIM SIM1 may operate in the DRX mode in the first wireless communication. In operation S404, RF resource allocation to the first SIM SIM1 may be released by a resource manager, and the first SIM SIM1 may transit to the sleep state.

In operation S403, the second SIM SIM2 may request RF resource allocation from the resource manager, and in operation S405, the resource manager may allocate an RF resource to the second SIM SIM2 in response to the request. In operation S406, the second SIM SIM2 may perform the second wireless communication with the second base station BS2. In operation S407, the resource manager may release the RF resource allocation to the second SIM SIM2.

In operation S408, the resource manager may allocate the RF resource to the third SIM SIM3 based on a previously determined RF resource allocation scheduling result. In operation S409, the third SIM SIM3 may perform the third wireless communication with the third base station B S3. In operation S410, the resource manager may release the RF resource allocation to the third SIM SIM3.

In operation S411, the resource manager may reallocate the RF resource to the first SIM SIM1. In operation S412, the first SIM SIM1 may adjust the time alignment timer based on a third time Tc corresponding to an RF resource allocation gap between operations S404 and S411. In an example embodiment, a length of the RF resource allocation gap may be obtained by counting time for which the RF resource is not allocated to the first SIM SIM1 or obtained by counting time for which the RF resource is allocated to the second SIM SIM2 and the third SIM SIM3. For example, the first SIM SIM1 may extend an expiry time of the time alignment timer by the third time Tc or extend the expiry time of the time alignment timer by an additional time generated by applying an offset to the third time Tc.

Figure 14:
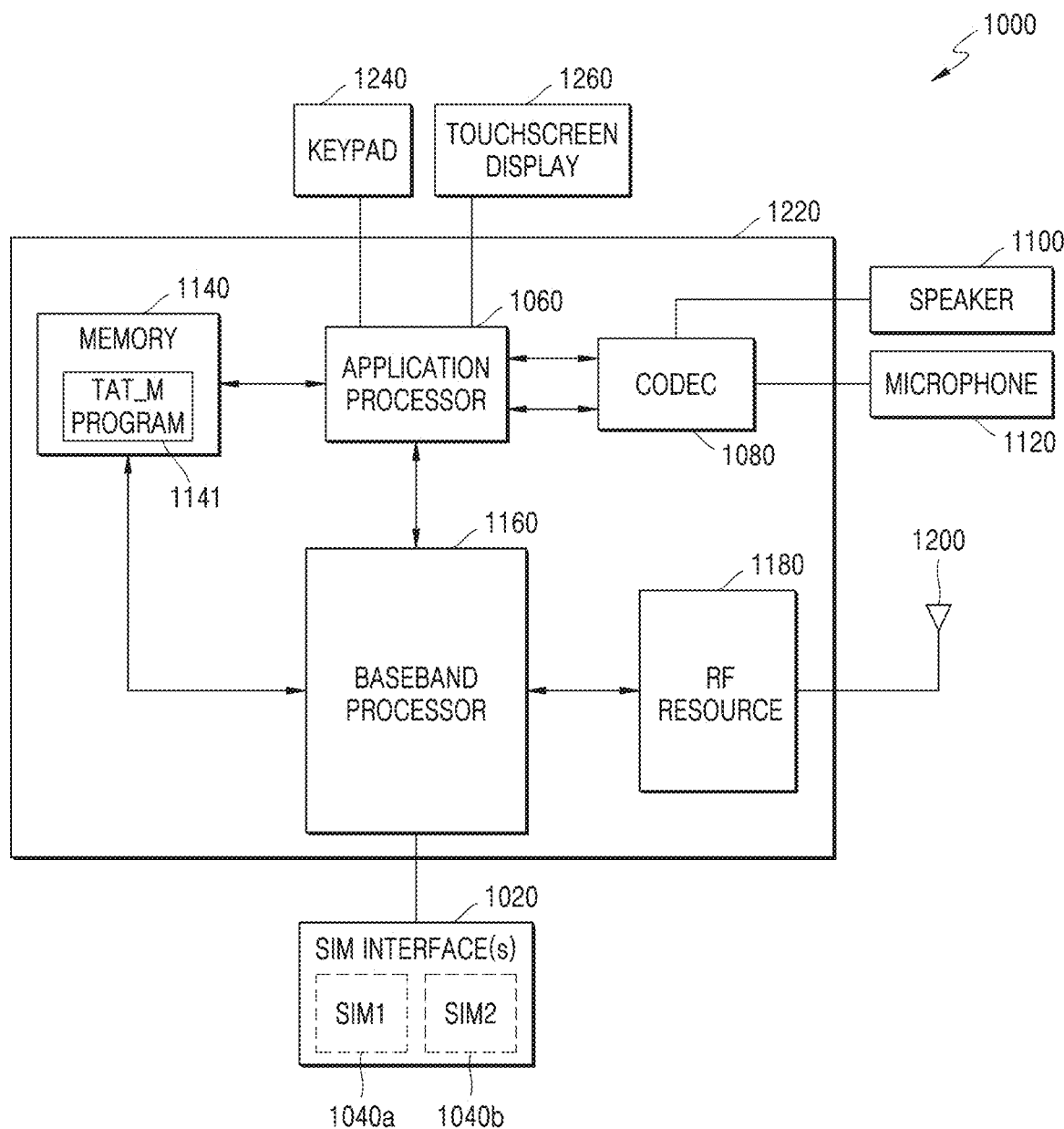
FIG. 14 is a block diagram of a wireless communication device according to an example embodiment of the inventive concepts.

FIG. 14 is a block diagram of a wireless communication device 1000 according to an example embodiment of the inventive concepts. Hereinafter, the wireless communication device 1000 may be referred to as a UE or a multi-SIM device as described above.

Referring to FIG. 14, the wireless communication device 1000 may include a SIM interface 1020. The wireless communication device 1000 may include a first SIM 1040a and a second SIM 1040b or be coupled to the first SIM 1040a and the second SIM 1040b through the SIM interface 1020. In various example embodiments, a SIM may be a universal integrated circuit card (UICC) including a SIM application and/or a universal SIM (USIM) application by which the SIM is accessible to various networks. The UICC may provide a storage for a telephone directory or other applications. Each of the first and second SIMs 1040a and 1040b may include a central processing unit (CPU), read-only memory (ROM), random access memory (RAM), electrically erasable programmable read-only memory (EEPROM), and input/output circuits.

The wireless communication device 1000 may include an application processor 1060 connected to a codec 1080. The codec 1080 may be connected to a speaker 1100 and a microphone 1120. The application processor 1060 may be connected to at least one memory 1140. The at least one memory 1140 may be a non-transitory computer-readable storage medium storing process-executable instructions. The at least one memory 1140 may store an operating system (OS), application software, and executable instructions.

In an example embodiment, the at least one memory 1140 may store a time alignment timer management program 1141. A baseband processor 1160 may execute the time alignment timer management program 1141 to adjust a time alignment timer according to an example embodiments of the inventive concepts.

The application processor 1060 and the at least one memory 1140 may be connected to the baseband processor 1160. Each of the first and second SIMs 1040a and 1040b in the wireless communication device 1000 may be associated with the baseband processor 1160 and an RF resource 1180. The wireless communication device 1000 is a DSDS device, and thus, the first and second SIMs 1040a and 1040b may share the RF resource 1180. The RF resource 1180 may be connected to at least one antenna 1200 and perform a transmission/reception operation for wireless communication services associated with each of the first and second SIMs 1040a and 1040b in the wireless communication device 1000. The RF resource 1180 may individually include a transmitter and a receiver, or include a transceiver in which transmitter and receiver functions are combined.

The wireless communication device 1000 may include a system-on-chip 1220 including the application processor 1060, the codec 1080, the at least one memory 1140, the baseband processor 1160, and the RF resource 1180. The first and second SIMs 1040a and 1040b and the SIM interface 1020 corresponding thereto may be outside the system-on-chip 1220. Example user input components suitable for use of the wireless communication device 1000 may include at least one of a keypad 1240 and a touchscreen display (or display device) 1260.

Figure 15:
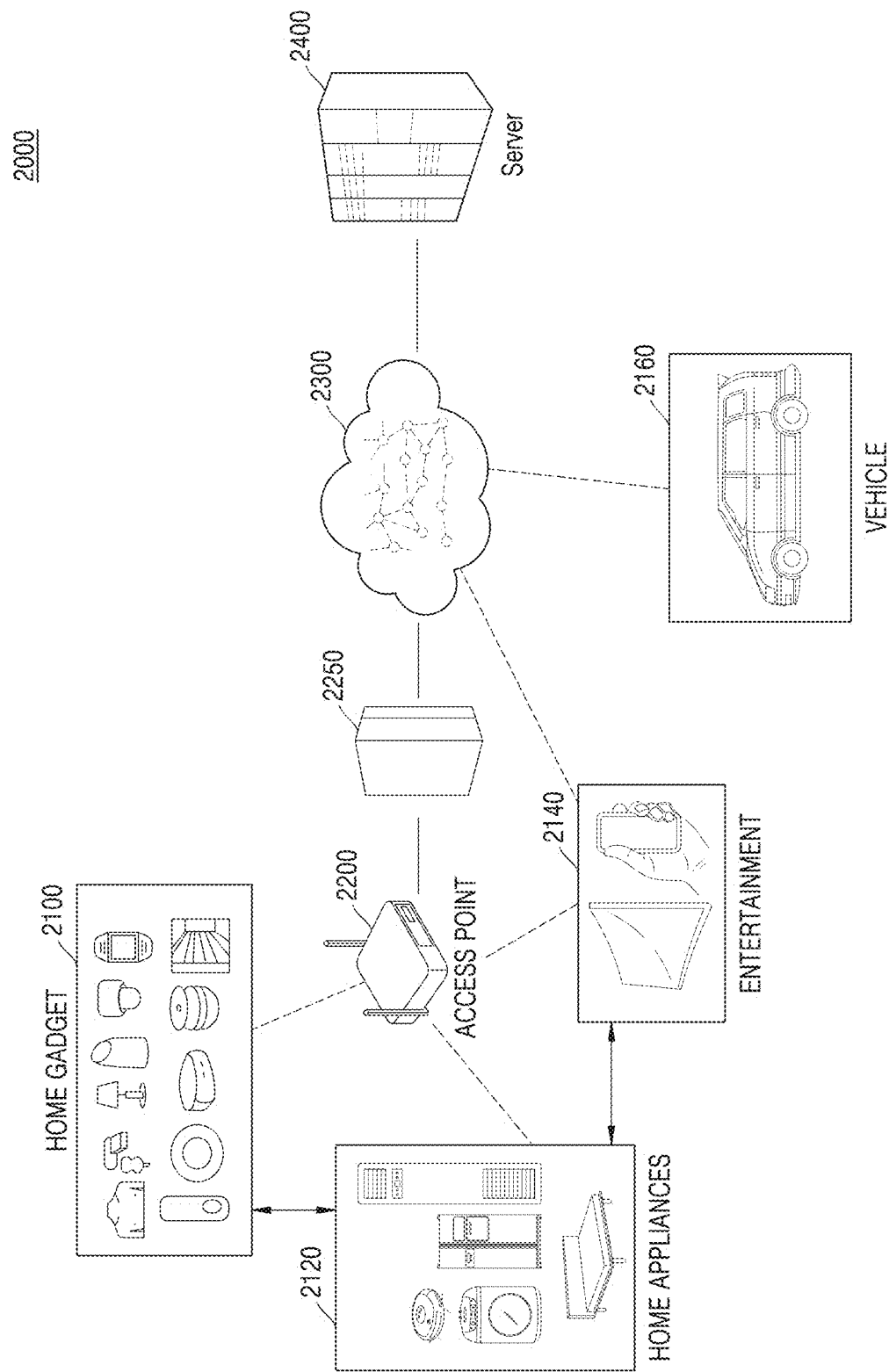
FIG. 15 is a conceptual diagram of an Internet of Things (IoT) network system to which some example embodiments of the inventive concepts are applied.

FIG. 15 is a conceptual diagram of an Internet of Things (IoT) network system 2000 to which some example embodiments of the inventive concepts are applied.

Referring to FIG. 15, the IoT network system 2000 may include a plurality of IoT devices 2100, 2120, 2140, and 2160, an AP 2200, a gateway 2250, a wireless network 2300, and a server 2400. IoT may indicate a network among things using wired/wireless communication.

The plurality of IoT devices 2100, 2120, 2140, and 2160 may form groups according to the characteristics thereof. For example, the plurality of IoT devices 2100, 2120, 2140, and 2160 may be grouped to a home gadget group 2100, a home appliance/furniture group 2120, an entertainment group 2140, a vehicle group 2160, and the like. The IoT devices 2100, 2120, and 2140 may be connected to a communication network or another IoT device through the AP 2200. The AP 2200 may be embedded in one IoT device. The gateway 2250 may change a protocol so that the AP 2200 is connected to an external wireless network. The IoT devices 2100, 2120, and 2140 may be connected to an external communication network through the gateway 2250. The wireless network 2300 may include the Internet and/or a public network. The plurality of IoT devices 2100, 2120, 2140, and 2160 may be connected to the server 2400, providing a certain service, through the wireless network 2300, and a user may use the service through at least one of the plurality of IoT devices 2100, 2120, 2140, and 2160.

According to some example embodiments of the inventive concepts, each of the plurality of IoT devices 2100, 2120, 2140, and 2160 may include a plurality of SIMs and adjust a time alignment timer to efficiently use, as a DSDS device, a limited RF resource.

Any functional blocks shown in the figures and described above may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concept has been particularly shown and described with reference to some example embodiments thereof, it will be understood that various changes in form and details may be made therein without departing from the spirit and scope of the following claims.

What is claimed is:

1. A multi-subscriber identity module (SIM) device comprising:
   a first SIM for first wireless communication;
   a second SIM for second wireless communication; and
   a processor configured to,
      allocate a radio frequency (RF) resource to any one of the first and second SIMs,
      control first uplink time alignment of the first wireless communication by allocating the RF resource to the first SIM, and
      adaptively adjust a first time alignment timer for the first uplink time alignment to release of a physical uplink control channel (PUCCH) scheduling request (SR) resource set in the first wireless communication based on an RF resource allocation gap of the first SIM when the RF resource is allocated from the first SIM to the second SIM and the RF resource is reallocated from the second SIM to the first SIM such that the first time alignment timer is restarted when the first time alignment timer has expired in the RF resource allocation gap of the first SIM to extend time to receive a timing advance command from a base station.

2. The multi-SIM device of claim 1, wherein the processor is further configured to extend an expiry time of the first time alignment timer by a time corresponding to the RF resource allocation gap.

3. The multi-SIM device of claim 1, wherein the processor is further configured to extend an expiry time of the first time alignment timer by a time corresponding to a type of process performed by allocating the RF resource to the second SIM.

4. The multi-SIM device of claim 1, wherein the processor is further configured to transmit a scheduling request to the base station through the RF resource before the adjusted first time alignment timer expires.

5. The multi-SIM device of claim 1, wherein the processor is further configured to perform a random access procedure with the base station through the RF resource when the adjusted first time alignment timer expires.

6. The multi-SIM device of claim 1, wherein the processor is further configured to perform the first wireless communication in a discontinuous reception mode.

7. The multi-SIM device of claim 1, wherein
   the first wireless communication corresponds to a packet switched (PS) network, and
   the second wireless communication corresponds to a circuit switched (CS) network or the PS network.

8. The multi-SIM device of claim 1, wherein the processor is further configured to prevent release of the physical uplink control channel (PUCCH) scheduling request (SR) resource during the RF resource allocation gap based on the adjusted first time alignment timer.

9. The multi-SIM device of claim 1, wherein the processor is further configured to,
   control second uplink time alignment of the second wireless communication by allocating the RF resource to the second SIM, and
   adjust a second time alignment timer for the second uplink time alignment by considering an RF resource allocation gap of the second SIM when the RF resource is allocated from the second SIM to the first SIM, and the RF resource is reallocated from the first SIM to the second SIM.

10. An operation method of a multi-subscriber identity module (SIM) device comprising a first SIM and second SIM, the operation method comprising:
    performing first wireless communication with a first base station by using a radio frequency (RF) resource allocated to the first SIM;
    allocating the RF resource to the second SIM;
    performing second wireless communication with a second base station by using the RF resource allocated to the second SIM;
    reallocating the RF resource to the first SIM; and
    adaptively adjusting a first time alignment timer for first uplink time alignment to release of a physical uplink control channel (PUCCH) scheduling request (SR) resource set in the first wireless communication based on an RF resource allocation gap of the first SIM counted by the multi-SIM device such that the first time alignment timer is restarted when the first time alignment timer has expired in the RF resource allocation gap of the first SIM to extend time to receive a timing advance command from a base station.

11. The operation method of claim 10, wherein, in the allocating of the RF resource to the second SIM, the multi-SIM device is in a sleep state of a discontinuous reception mode in the first wireless communication.

12. The operation method of claim 10, wherein, in the reallocating of the RF resource to the first SIM, the multi- SIM device is in a wake-up state of a discontinuous reception mode in the first wireless communication.

13. The operation method of claim 10, wherein the adjusting of the first time alignment timer comprises extending an expiry time of the first time alignment timer by a time corresponding to the RF resource allocation gap.

14. The operation method of claim 10, wherein the adjusting of the first time alignment timer comprises extending an expiry time of the first time alignment timer by a time corresponding to a type of process performed in the second wireless communication.

15. The operation method of claim 10, further comprising:
    transmitting a scheduling request to the first base station through the physical uplink control channel (PUCCH) scheduling request (SR) resource set in the first wireless communication based on the adjusted first time alignment timer.

16. The operation method of claim 15, wherein the transmitting of the scheduling request to the first base station comprises:
    receiving the timing advance command from the first base station; and
    restarting the adjusted first time alignment timer in response to the timing advance command.

17. The operation method of claim 15, further comprising:
    receiving, from the first base station, a scheduling approval according to the scheduling request; and
    performing the first wireless communication with the first base station based on information included in the scheduling approval.

18. A multi-subscriber identity module (SIM) device comprising:
    a plurality of SIMs; and
    a processor configured to,
        allocate a radio frequency (RF) resource to any one of the plurality of SIMS,
        perform wireless communication with a base station by allocating the RF resource to a target SIM among the plurality of SIMs, and
        adaptively adjust a time alignment timer related to release of a physical uplink control channel (PUCCH) scheduling request (SR) resource set in the wireless communication by considering an RF resource allocation gap of the target SIM when the RF resource is allocated from the target SIM to a different SIM among the plurality of SIMs and the RF resource is reallocated from the different SIM to the target SIM such that the time alignment timer is restarted when the time alignment timer has expired in the RF resource allocation gap of the target SIM to extend time to receive a timing advance command from the base station.

* * * * *